(12) United States Patent
Park et al.

(10) Patent No.: US 10,939,179 B2
(45) Date of Patent: Mar. 2, 2021

(54) METHOD AND DEVICE FOR PROVIDING MEDIA CONTENT

(71) Applicant: Samsung Electronics Co., Ltd., Suwon-si (KR)

(72) Inventors: Kyung-Mo Park, Seoul (KR); Jae-Hyeon Bae, Seoul (KR); Young-Wan So, Gunpo-si (KR); Hyun-Koo Yang, Seoul (KR); Dong-Yeon Kim, Seoul (KR); Hyeon-Cheol Pu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/306,812

(22) PCT Filed: Jun. 2, 2017

(86) PCT No.: PCT/KR2017/005816
§ 371 (c)(1),
(2) Date: Dec. 3, 2018

(87) PCT Pub. No.: WO2017/209574
PCT Pub. Date: Dec. 7, 2017

(65) Prior Publication Data
US 2019/0222904 A1     Jul. 18, 2019

(30) Foreign Application Priority Data
Jun. 2, 2016   (KR) .................. 10-2016-0069108

(51) Int. Cl.
*H04N 21/6332* (2011.01)
*H04N 21/462* (2011.01)
(Continued)

(52) U.S. Cl.
CPC ..... *H04N 21/6332* (2013.01); *H04N 21/2343* (2013.01); *H04N 21/23424* (2013.01);
(Continued)

(58) Field of Classification Search
CPC ......... H04N 21/23424; H04N 21/2343; H04N 21/262; H04N 21/26258; H04N 21/435;
(Continued)

(56) References Cited

U.S. PATENT DOCUMENTS 7,530,086 B2   5/2009 Brassil
9,066,138 B1 * 6/2015 Kraiman .............. H04N 21/458
(Continued)

FOREIGN PATENT DOCUMENTS

CN      102119373 A    7/2011
CN      102164133 A    8/2011
(Continued)

OTHER PUBLICATIONS

Kim et al.; Draft of White Paper on MPEG Media Transport (MMT); International Organisation for Standardisation Organisation Internationale De Normalisation; ISO/IEC JTC1/SC29/WG11 Coding of Moving Pictures and Audio; XP030064393; Feb. 2015; p. 1-12; Genève, Switzerland.
(Continued)

*Primary Examiner* — Chenea Davis
(74) *Attorney, Agent, or Firm* — Jefferson IP Law, LLP

(57) ABSTRACT

According to an embodiment of the disclosure, a method for providing media content comprises the steps of: receiving a change request message for requesting a change of at least a part of specific media data constituting media content; updating a signaling message for the consumption of the media content on the basis of the change request message; and transmitting the updated signaling message to a reception entity.

17 Claims, 17 Drawing Sheets

(51) Int. Cl.
  *H04N 21/262* (2011.01)
  *H04N 21/435* (2011.01)
  *H04N 21/482* (2011.01)
  *H04N 21/234* (2011.01)
  *H04N 21/2343* (2011.01)
  *H04N 21/643* (2011.01)
  *H04N 21/854* (2011.01)

(52) U.S. Cl.
  CPC ..... *H04N 21/262* (2013.01); *H04N 21/26258* (2013.01); *H04N 21/435* (2013.01); *H04N 21/462* (2013.01); *H04N 21/482* (2013.01); *H04N 21/643* (2013.01); *H04N 21/854* (2013.01)

(58) Field of Classification Search
  CPC .............. H04N 21/462; H04N 21/482; H04N 21/6332; H04N 21/643; H04N 21/854
  See application file for complete search history.

(56) References Cited

U.S. PATENT DOCUMENTS

| | | |
|---|---|---|
| 2009/0217316 A1 | 8/2009 | Gupta |
| 2011/0138432 A1 | 6/2011 | Mitra et al. |
| 2012/0137015 A1 | 5/2012 | Sun |
| 2013/0305304 A1 | 11/2013 | Hwang et al. |
| 2015/0020138 A1 | 1/2015 | Bae |
| 2015/0195159 A1 | 7/2015 | Kim et al. |
| 2015/0341410 A1* | 11/2015 | Schrempp .......... H04L 65/4069 709/231 |
| 2015/0381755 A1* | 12/2015 | Li ..................... H04L 67/2842 709/214 |
| 2016/0026823 A1 | 1/2016 | Kollenkark et al. |
| 2016/0149994 A1* | 5/2016 | Kitazato ................ H04H 60/07 709/219 |

FOREIGN PATENT DOCUMENTS

| | | |
|---|---|---|
| KR | 10-2010-0119893 A | 11/2010 |
| KR | 10-2013-0090824 A | 8/2013 |
| KR | 10-2014-0103846 A | 8/2014 |
| KR | 10-2015-0083311 A | 7/2015 |
| KR | 10-2016-0003298 A | 1/2016 |

OTHER PUBLICATIONS

Suh et al.; TRUFFLE: request of virtualized network function to MANE; International Organisation for Standardisation Organisation Internationale De Normalisation; ISO/IEC JTC1/SC29/WG11; Coding of Moving Pictures and Audio; XP030066216; Feb. 2016; p. 1-3; San Diego, CA.

Lee et al.; Dynamic video insertion of multiple videos; International Organisation for Standardisation Organisation Internationale De Normalisation; ISO/IEC JTC1/SC29/WG11; Coding of Moving Pictures and Audio; XP030067077; May 2016; p. 1-6; Genève, Switzerland.

Kim et al.; Real-time advertisement insertion on MANE; International Organisation for Standardisation Organisation Internationale De Normalisation; ISO/IEC JTC1/SC29/WG11; Coding of Moving Pictures and Audio; XP030067594; Oct. 2016; p. 1-6; Chengdu, China.

European Search Report dated May 23, 2019; European Appln. No. 17807067.8.

Chinese Office Action dated Oct. 12, 2020, issued in Chinese Patent Application No. 201780034391.0.

* cited by examiner

US 10,939,179 B2

METHOD AND DEVICE FOR PROVIDING MEDIA CONTENT

PRIORITY

This application is a U.S. National Stage application under 35 U.S.C. § 371 of an International application filed on Jun. 2, 2017 and assigned application number PCT/KR2017/005816, which claimed the benefit of a Korean patent application filed on Jun. 2, 2016 in the Korean Intellectual Property Office and assigned Serial number 10-2016-0069108, the entire disclosure of which is hereby incorporated by reference.

TECHNICAL FIELD

The disclosure relates to methods and devices for providing media content.

BACKGROUND

Typically, conventional broadcast networks take advantage of moving picture experts group-2 transport stream (MPEG-2 TS) to transmit media content. MPEG-2 TS is used as a representative transmission technique for multiple broadcast programs (multiple encoded video bit streams) to transmit multiplexed bit streams in erroneous transmission environments. As an example, MPEG-2 TS is appropriate for, e.g., digital TV broadcast in the multimedia era. However, MPEG-2 TS has its own limitations in supporting multimedia services. For example, upon transmitting the transport protocol and Internet protocol (IP) specified for audio/video, MPEG-2 TS may cause unnecessary overhead due to inefficiency in transmission attributable to uni-lateral communication and fixed frame sizes. Thus, the MPEG has proposed MPEG media transport (MMT) as a multimedia transmission technique to support multimedia services based on MPEG technology. In particular, the MMT standard has been suggested in order to overcome the limitations of MPEG-2 TS.

The MMT standard is applicable for efficiently transmitting composite content over a hybrid network. Here, 'composite content' refers to a set of contents with multimedia components of videos/audios/applications/widgets. 'Hybrid network' means a mixed network of, e.g., a broadcast network and a telecommunications network.

Further, the MMT standard defines IP friendlier transmission techniques which are basic for transmission networks for multimedia services. In other words, there are ongoing research efforts in relation to the MMT standard in order to provide efficient MPEG transmission technology in varying, representatively IP-based, multimedia service environments.

SUMMARY

According to an embodiment of the disclosure, there is provided a method and device for providing media content.

According to an embodiment of the disclosure, there is provided a method and device for transmitting and receiving signaling information related to media content to provide the media content.

According to an embodiment of the disclosure, there is provided a method and device for modifying/replacing/overlaying particular media data of first media content, thereby providing second media content.

According to an embodiment of the disclosure, there is provided a method and device for transmitting and receiving information indicating that particular media data of first media content is modified/replaced/overlaid.

According to an embodiment of the disclosure, there is provided a method and device for updating relevant signaling messages where particular media data of first media content is modified/replaced/overlaid.

According to an embodiment of the disclosure, a method for providing media content comprises receiving a modification request message requesting to modify particular media data of at least part of the media content, updating a signaling message for consuming the media content based on the modification request message, and transmitting the updated signaling message to a receiving entity.

According to an embodiment of the disclosure, a device configured to provide media content comprises a transceiver configured to receive a modification request message requesting to modify particular media data of at least part of the media content and a controller configured to update a signaling message for consuming the media content based on the modification request message, wherein the transceiver is configured to transmit the updated signaling message to a receiving entity.

<Drawings for the Second Disclosure>

Figure 9:
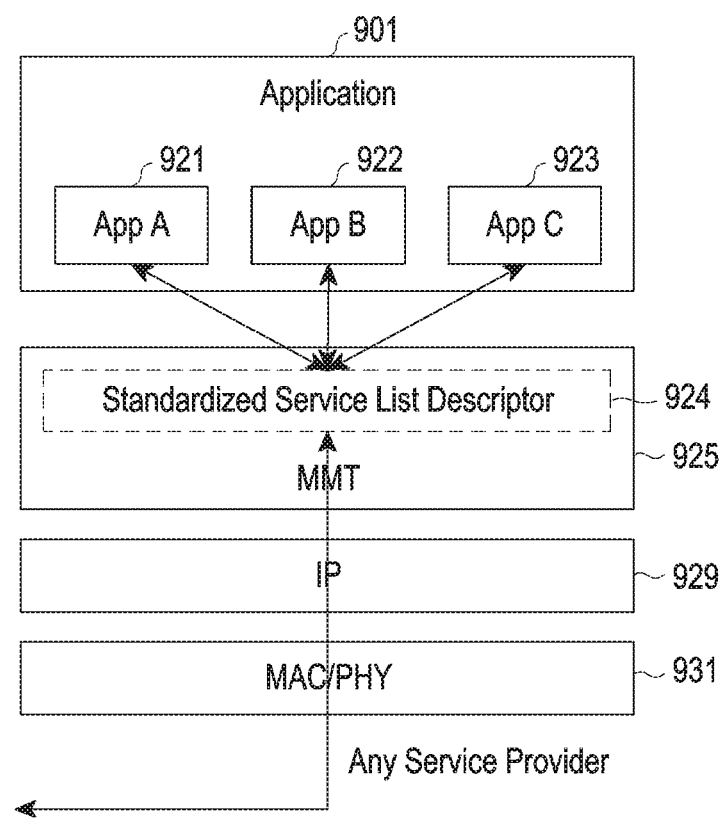
Figure 10:
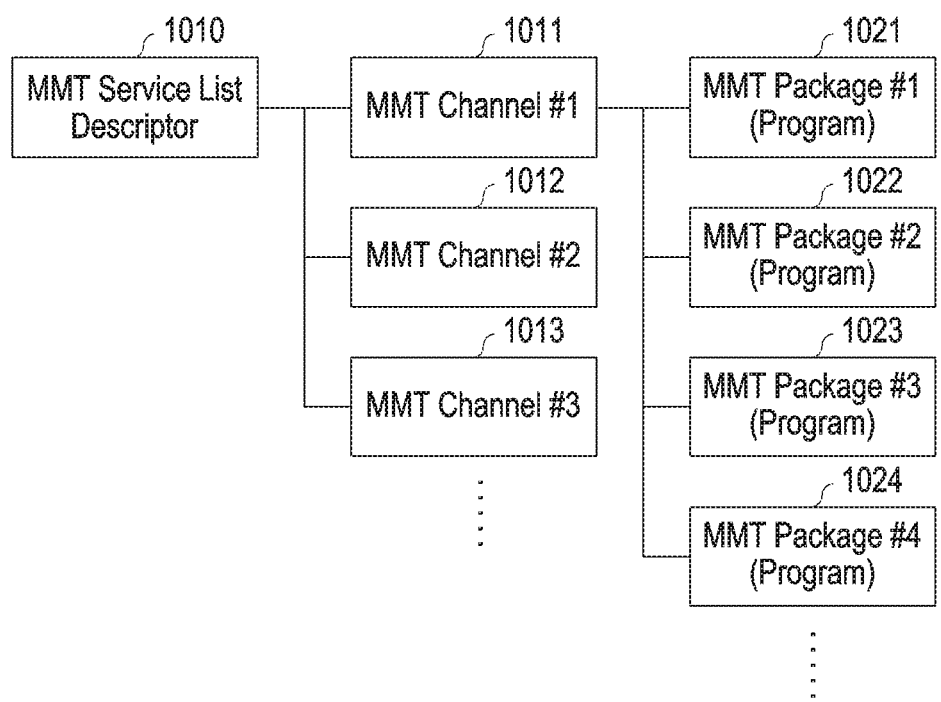
Figure 11:
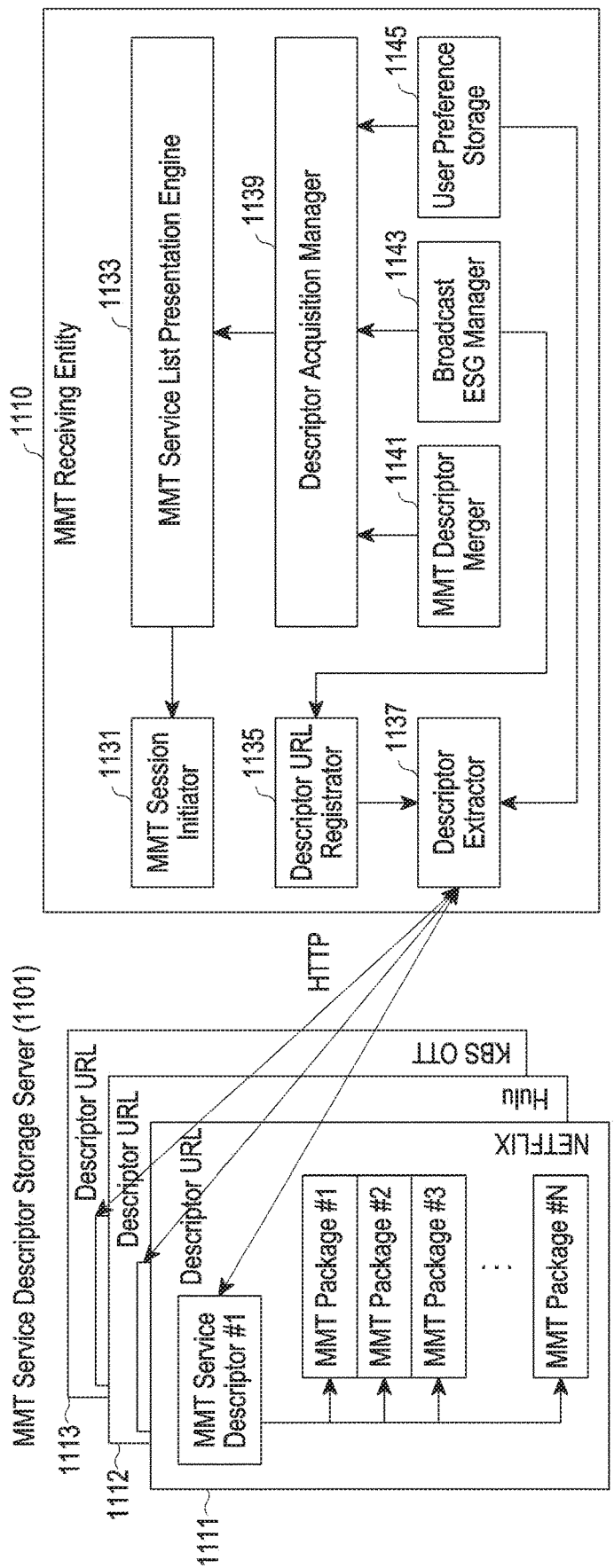
Figure 12:
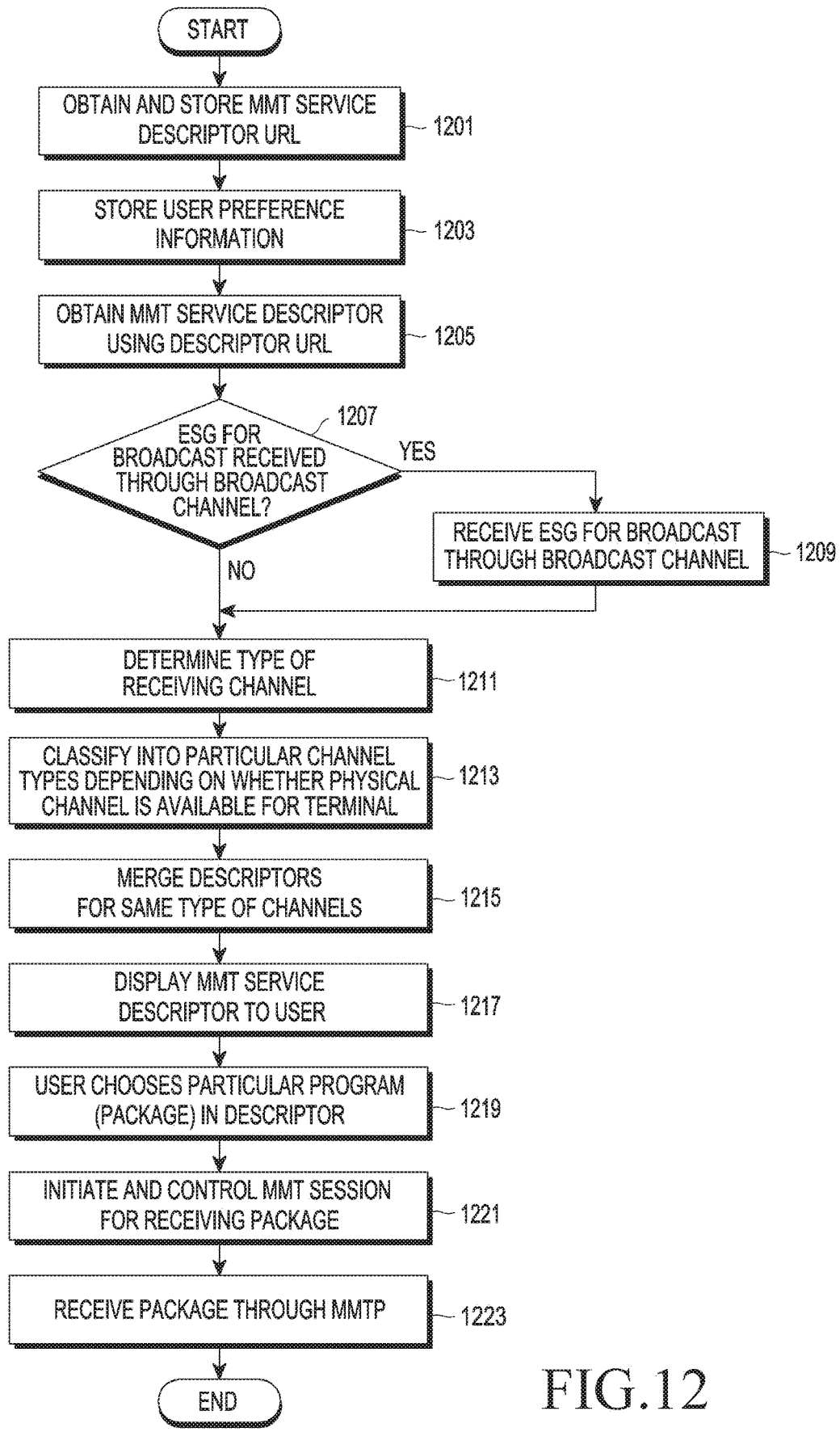
Figure 13:
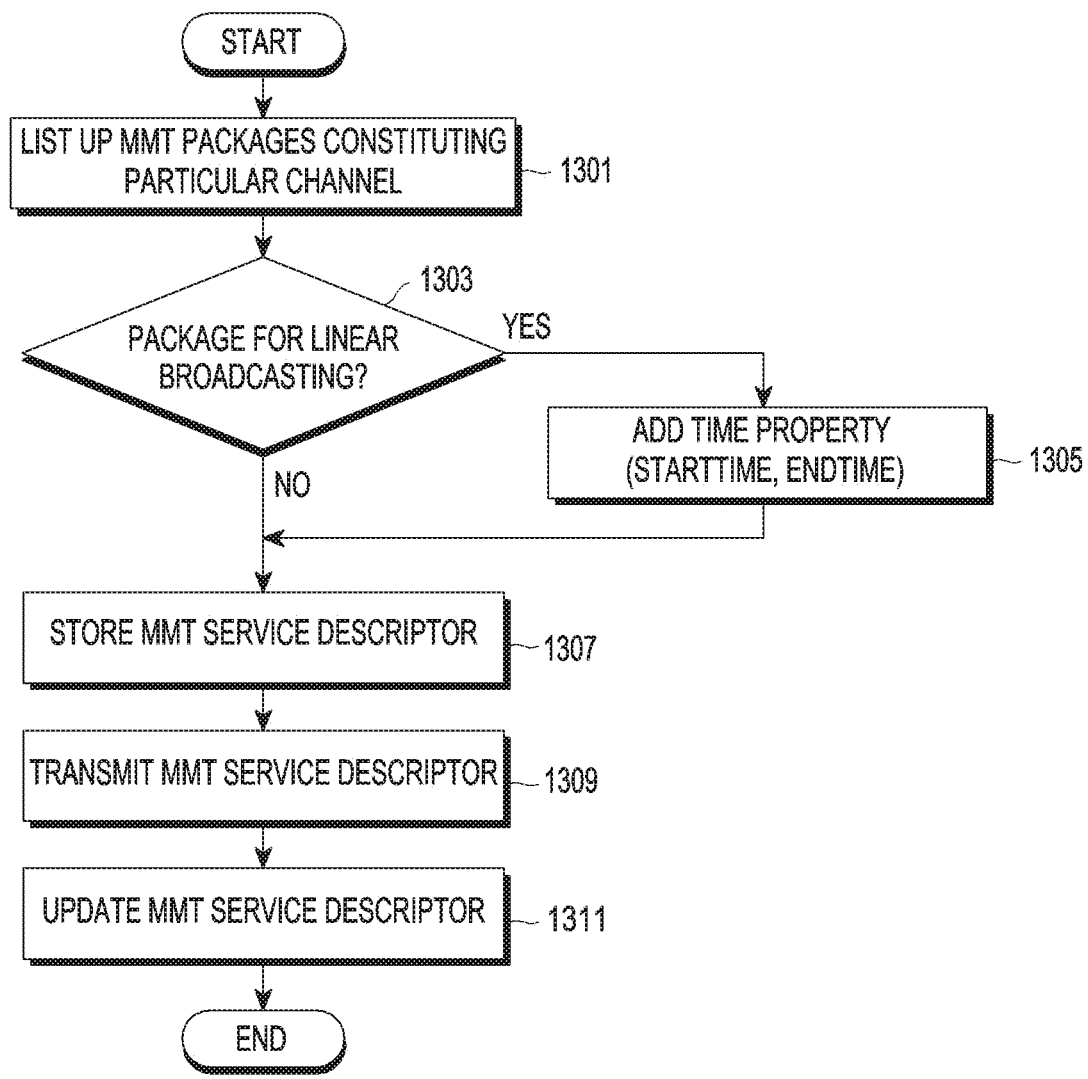
Figure 14:
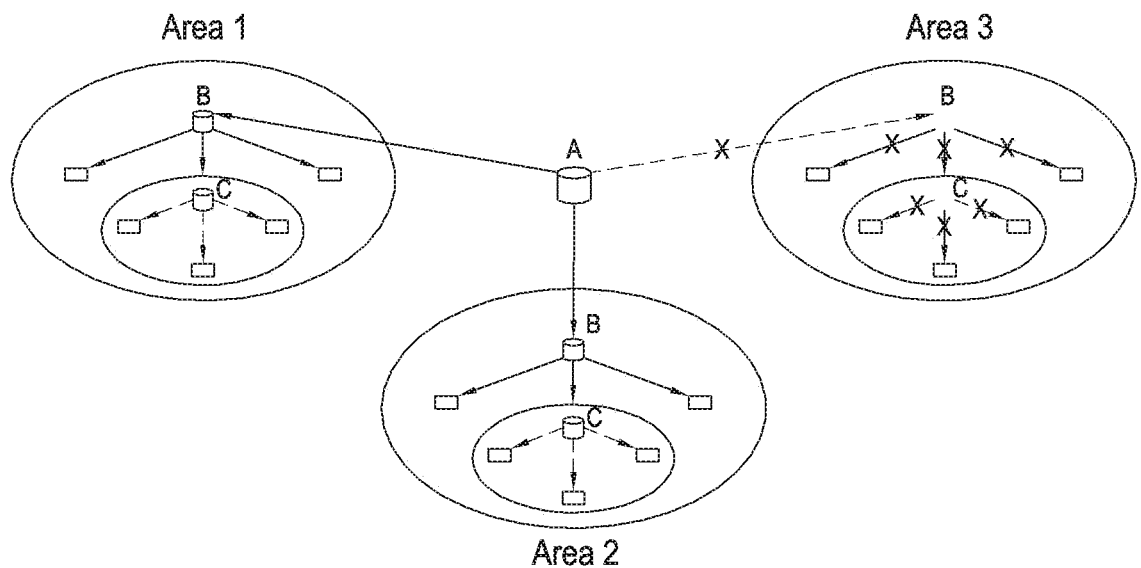

FIG. 9 is a view illustrating the concept of providing broadcast service information according to an embodiment of the second disclosure;

FIG. 10 is a view illustrating an MMT service descriptor data model according to an embodiment of the second disclosure;

FIG. 11 is a view illustrating a structure of an MMT receiving entity according to an embodiment of the second disclosure;

FIG. 12 is a view illustrating operations of an MMT receiving entity according to an embodiment of the second disclosure;

FIG. 13 is a view illustrating operations of an MMT transmitting entity according to an embodiment of the second disclosure;

FIG. 14 is a view schematically illustrating a media streaming environment configuration in a common multimedia system according to a third disclosure;

<Drawings for the Second Disclosure>

Figure 15:
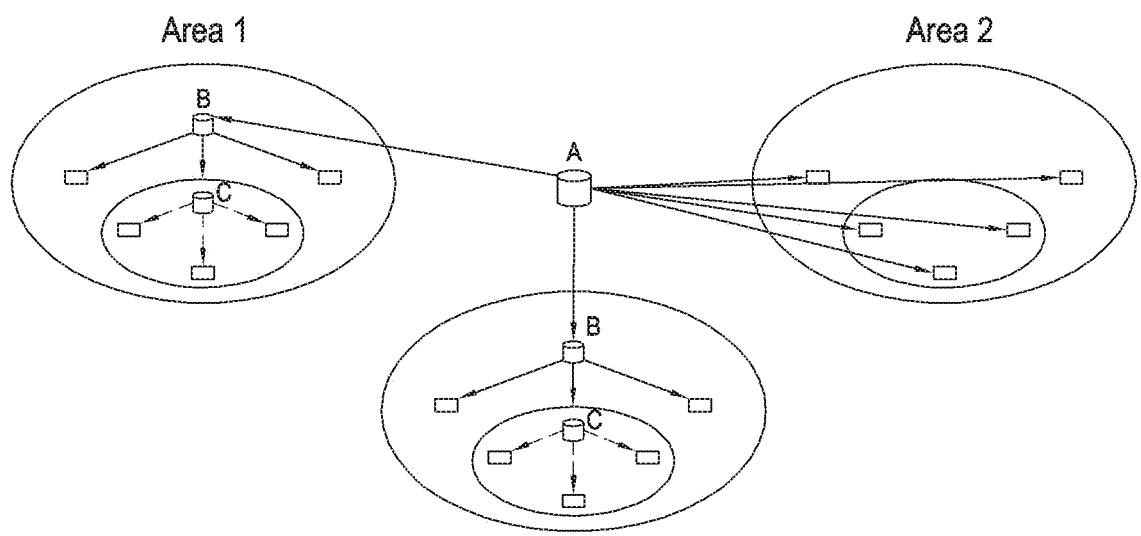
Figure 16:
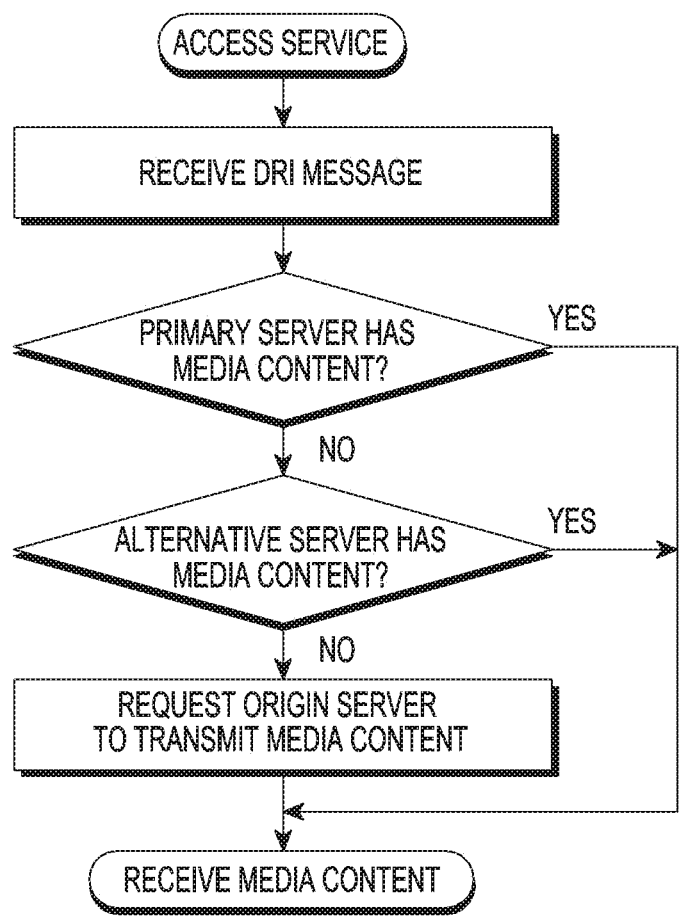
Figure 17:
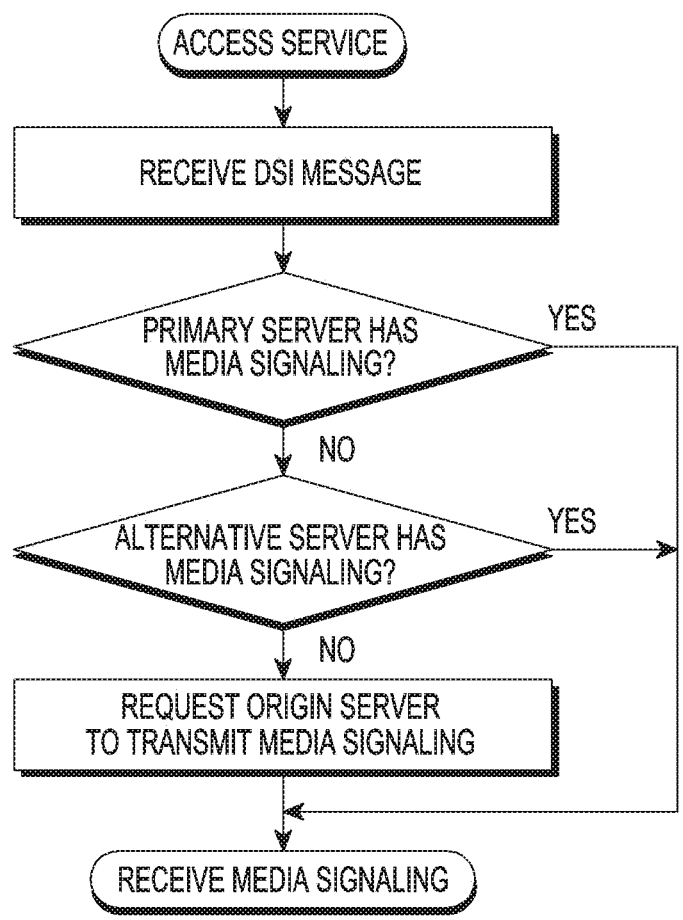
Figure 18:
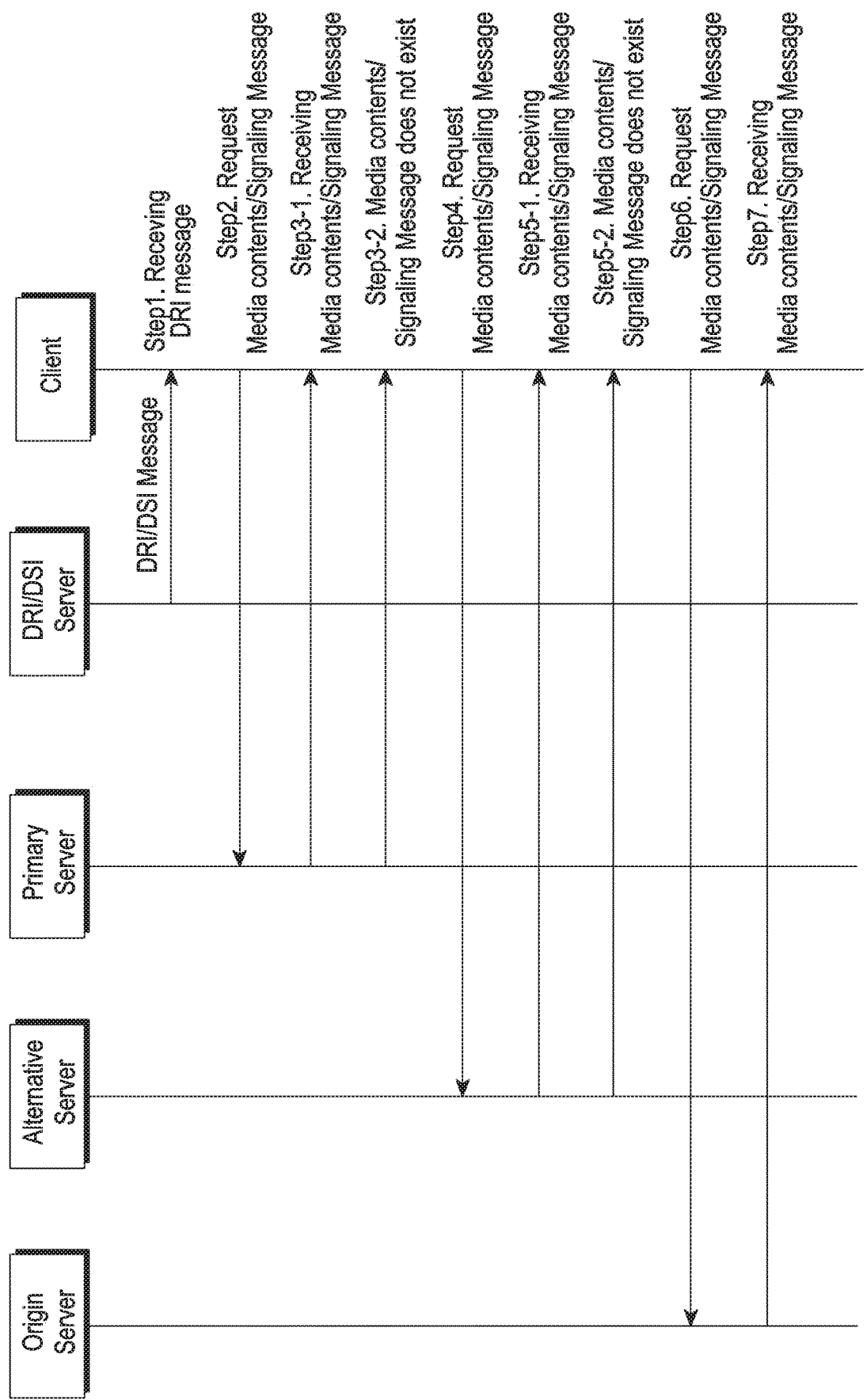

FIG. 15 is a view schematically illustrating a streaming environment configuration utilizing media resource information in a multimedia system according to an embodiment of the third disclosure;

FIG. 16 is a view schematically illustrating an example of operations of a receiver to receive media content based on a DRI message in a multimedia system according to an embodiment of the third disclosure;

FIG. 17 is a view schematically illustrating an example of operations of a receiver to receive media signaling information based on a DSI message in a multimedia system according to an embodiment of the third disclosure; and FIG. 18 is a view schematically illustrating an example of operations utilizing a DRI message and a DSI message in a multimedia system according to an embodiment of the third disclosure.

DETAILED DESCRIPTION

Hereinafter, embodiments of the present disclosure are described in detail with reference to the accompanying drawings. The same reference numerals are used to refer to same elements throughout the drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before getting into the detailed description of the disclosure, particular terms or phrases used herein may be defined merely for ease of description.

As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof.

The term "controller" means a device, system, or par thereof, to control at least one operation. The device may be implemented in hardware, firmware, software, or a combination of some of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

First Disclosure

Hereinafter, embodiments of the disclosure are described. The embodiments of the disclosure are described for MPEG media transport (MMT) broadcast systems. This is merely for ease of description purposes and should not be interpreted as limiting the disclosure to MMT broadcast systems.

Figure 1:
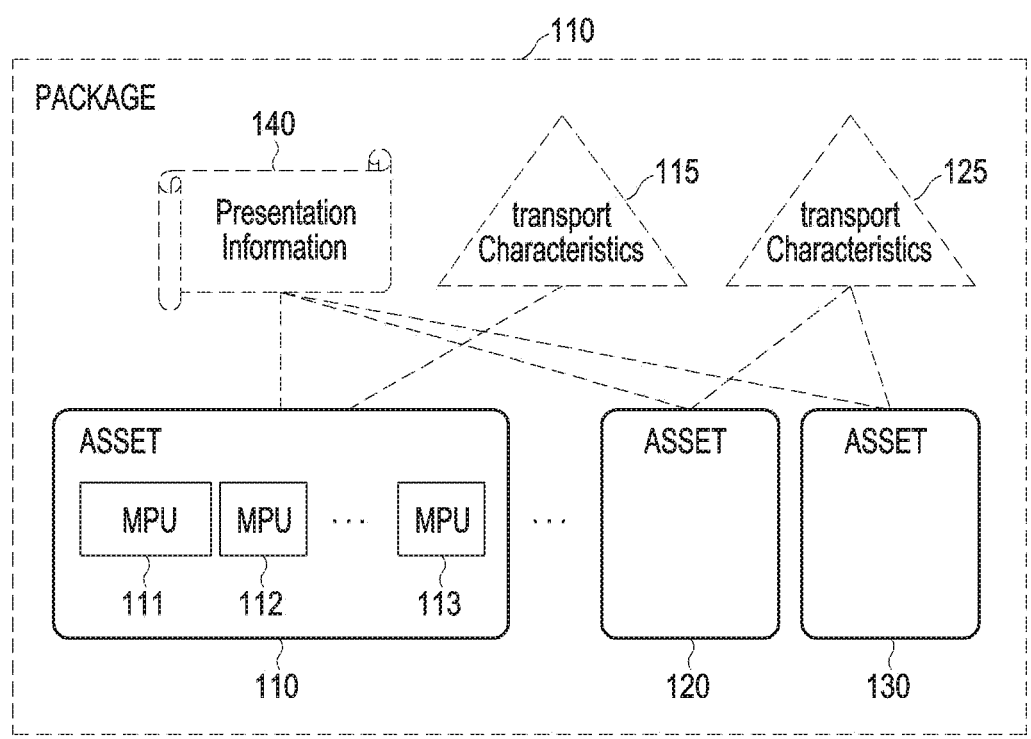
FIG. 1 is a view illustrating an MMT data model according to the disclosure.

FIG. 1 is a view illustrating an MMT data model according to the disclosure.

The MMT defines an MMT flow, called a package 100, which is a set of encoded media data and its related information, i.e., metadata.

The package 100 includes at least one MMT asset 110, 120, and 130, at least one piece of "transport characteristic" or "asset delivery characteristics (ADC) (115 and 125) information, and at least one piece of presentation information (PI) 140. For reference, 'MMT asset' means multimedia data that can be used to produce a multimedia presentation, such as video, audio, text, file, or widget.

Each MMT asset 110, 120, and 130 may be divided into at least one media processing unit (MPU). FIG. 1 illustrates that MMT asset 1 110 is divided into multiple MPUs 111, 112, . . . , 113. 'MPU' refers to the unit of data in which an MMT stream is independently processed, i.e., transmitted or decoded. Meanwhile, one MPU can be split into multiple fragments, and each fragment is called a "MPU fragment unit (MFU)."

An MMT transmitting entity splits and processes media data in MPU units, and an MMT receiving entity receives, as well as processes for playback, media data in MPU units. For reference, the MPU contains media data and various pieces of information related to the media data.

The transport characteristic information, or ADC 115 and 125, contains information for providing the transport characteristics of the MMT asset per MMT asset. That is, the ADC 115 represents the transport characteristics of asset 1 110, and the ADC 125 represents the transport characteristics of asset 2 120 and asset 3 130.

The presentation information (PI) 140 contains information to describe temporal and spatial relationships between the plurality of assets 110, 120, and 130.

Figure 2:
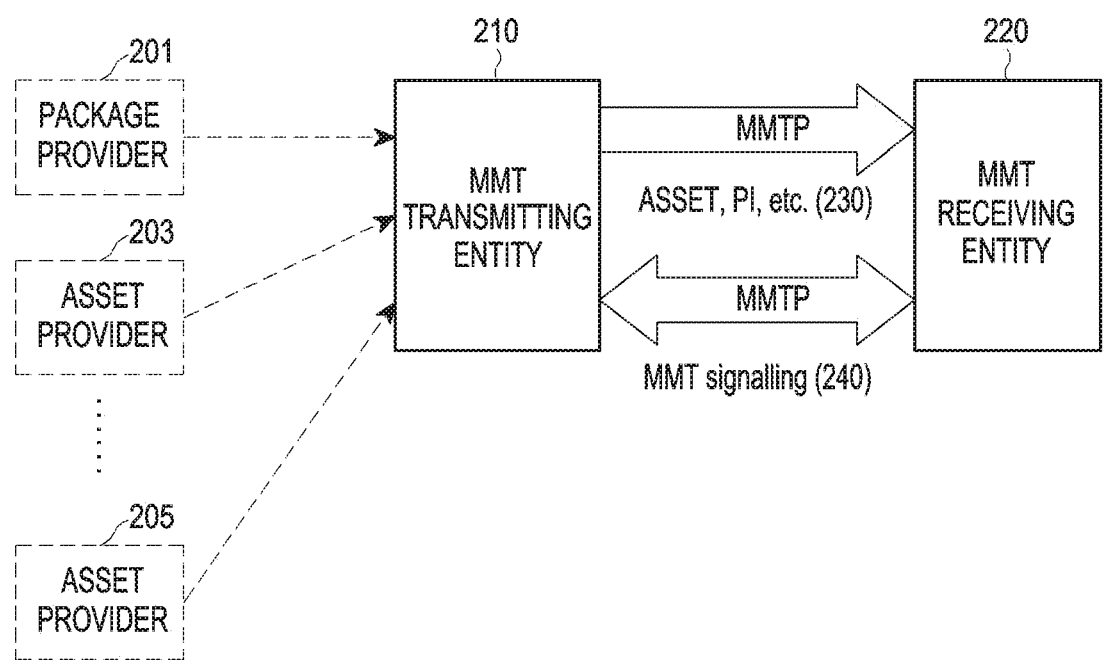
FIG. 2 is a view schematically illustrating an example in which an MMT transmitting entity 210 and an MMT receiving entity 220 transmit and receive MMT packages according to the disclosure.

FIG. 2 is a view schematically illustrating an example in which an MMT transmitting entity 210 and an MMT receiving entity 220 transmit and receive MMT packages according to the disclosure.

The MMT transmitting entity 210 (hereinafter, simply referred to as a "transmitting entity 210") transmits packages, as MMT packet flows, to the MMT receiving entity 220 (hereinafter, simply referred to as a "receiving entity 220"). Meanwhile, the transmitting entity 210 may be any entity to transmit MMT media data, e.g., an MMT broadcast server. The receiving entity 220 may be any entity to receive MMT media data, e.g., an MMT client terminal or user equipment (UE).

The transmitting entity 210 may gather contents from asset providers 203 and 205 based on the presentation information (PI) of the package provided by the package provider 201. Here, the package provider 201 and the asset providers 203 and 205 may be located physically together.

The transmitting entity 210 may transmit the package, which contains the asset, transport characteristic information, and presentation information, via an MMT protocol (MMTP) (230). The transmitting entity 210 and the receiving entity 220 may transmit and receive signaling information via the MMTP (240). The signaling messages are transmitted and received to manage the delivery and consumption of the package.

For reference, the MMT protocol is briefly described. The MMT protocol is an application layer transport protocol to packetize and transmit MMT packages, and has been designed to efficiently and reliably transmit packages. The MMT protocol has enhanced features, such as media multiplexing and network jitter calculation. These features allow for efficient transmission of content consisting of media data encoded in various types. The MMT protocol may operate on a higher layer of the existing network protocol, e.g., UDP or IP. Further, the MMT protocol has been designed to support various applications.

If the transmitting entity 210 is an MMT broadcast server, and the receiving entity 220 is a UE, then the MMT broadcast server may transmit MMT media data to the UE via a base station, or a transmitting entity performing similar functions over the network. The transmitting entity performing similar functions to the base station over the network may be, e.g., an access point (AP) in a wireless LAN system. For ease of description, the term "base station" is used to encompass a base station in a cellular communication system and an AP in a wireless LAN communication system. In the MMT system, the above-described network entity is referred to as an MMT-aware network entity (MANE)." In the MMT system, the MANE is defined as a network entity able to be aware of the types and characteristics of media carried by the MANE using means provided by MMT technology. The MANE may obtain media-related information from, e.g., the headers of MMTP packets and the MMT signaling message, carried by the media. The media-related information enables media-aware operations.

Hereinafter, embodiments of the disclosure are described in detail.

The basic concept of the disclosure is that the network server receives first content from the broadcaster server and provides the same to the user while providing second content, e.g., a separate advertisement, to the user. Specifically, upon receiving a message requesting to change the media data of at least part of the first content while processing the signaling message related to the first content, the network entity updates the signaling message related to the change-requested media data and transmits the updated signaling message to the user, thereby providing the second content to the user. In some cases, however, the second content may be served overlaid on the first content. To that end, flag information (asset_modification_flag) is defined in the first content-related signaling message to indicate the modification to the media data, according to the disclosure. Further, according to the disclosure, a message (AssetChangeRequest_message) is newly defined in order to request to modify/replace/overlay the first content in relation to the second content.

Prior to the description of embodiments of the disclosure, the signaling message (or "signaling information") is briefly described. The media service provider produces and provides content resource information and media content signaling information to provide MMT-based media services. The MMT defines the signaling message to transmit and receive information necessary for the delivery or consumption of packages.

The signaling messages related to the consumption of the package include the following messages.

Package Access (PA) message: This type of message contains a package access (PA) table containing information about all signaling tables necessary for package access, an MMT package (MP) table, and an MPI table.

Media Presentation Information (MPI) message: This type of message contains an MPI table that encapsulates all or a set of presentation information (PI) documents. Further, the MPI message may contain the MP table corresponding to the MPI table for quick package consumption.

MMT Package Table (MPT) message: This type of message contains an MP table to provide the whole or part of the information necessary for consuming a single package.

Clock Relation Information (CRI) message: This type of message contains a CRI table to provide clock-related information necessary for mapping between the NPT time stamp and the MPEG-2 system time clock.

Device Capability Information (DCI) message: This type of message contains a DCI table that provides device capability information necessary for package consumption.

The signaling messages defined for package delivery are as follows.

Hypothetical Receiver Buffer Model (HRBM) message: This type of message is used to provide information constituting the virtual receiver buffer model (HRBM) operation.

According to an embodiment of the disclosure, among the signaling messages, the PA message may be used. Thus, the PA message is described below.

The PA message carries the PA table. The PA table contains information for all of the other signaling tables for packages. The PA message carries the MPI table and MP table for transferring the minimum information for package processing.

The MMT receiving entity should process the PA message before processing any other signaling messages.

The syntax of the PA message is as shown in Table 1 below.

TABLE 1

| Syntax | Value | No. of bits | Mnemonic |
|---|---|---|---|
| PA_message ( ) { | | | |
|   message_id | | 16 | uimsbf |
|   version | | 8 | uimsbf |
|   length | | 32 | uimsbf |
|   extension { | | | |
|     number_of_tables | N1 | 8 | uimbsf |
|     for (i=0; i<N1; i++) { | | | |
|       table_id | | 8 | uimbsf |
|       table_version | | 8 | uimsbf |
|       table_length | | 16 | uimbsf |
|     } | | | |
|   } | | | |
|   message_payload { | | | |
|     for (i=0; i<N1; i++) { | | | |
|       table( ) | | | |
|     } | | | |
|   } | | | |
| } | | | |

The semantics of the PA message are defined as shown in Table 2 in the MMT standard specifications.

TABLE 2

*message_id - indicates the identifier of the PA messages.
*version -indicates the version of the PA messages.
*length - a 32-bit field for conveying the length of the PA message in bytes, counting from the beginning
of the next field to the last byte of the PA message. The value '0' is not valid for this field.
*number_of_tables-indicates the number of signalling tables included in this PA message.

TABLE 2-continued

*table_id - indicates the table identifier of a table included in this PA message. It is a copy of the table_id
field in the table included in the payload of this PA massage.
*table_version - indicates the version of a table included in this PA message. It is a copy of the version
field in the table included in the payload of this PA message.
*table_length - If the table is not an MPI table, it is a copy of the length field in the table included in the
message_payload of this PA message. If the table is an MPI table, it is the length derived from
the length and the extension length part. In this case the derived length is a value that
equals "the actual length" -5.
*table( ) - an MMT signalling table instance. The tables in the payload appear in the same order as the
table_ids in the extension field. An PA table shall be an instance for table( ).

Meanwhile, the MP table contains list information about all of the assets constituting a particular package. The MP table is defined in the MMT standard specifications as shown in Table 3 below.

TABLE 3

<The MP table>

Introduction
A complete MP table has the information related to a Package including the list of all Assets. A subset
MP table has a portion of information from a complete MP table.
In addition, MP table subset-0 has the minimum information required for Package consumption.

The syntax of the MP table defined in the MMT standard specifications is as shown in Tables 4 and 4B below.

TABLE 4

| Syntax | Value | No. of bits | Mnemonic |
|---|---|---|---|
| MP_table( ) { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   if ((table_id == 0x10) or | | | |
|   (table_id == 0x11)) | N1 | | |
|   {MMT_package_id { | | | |
|     MMT_package_id_length | | 8 | uimsbf |
|     for (i=0; i<N1; i++) : | | | |
|       MMT_package_id_byte | | 8 | uimsbf |
|     } | | | |
|   } | | | |

TABLE 4B

| | | | |
|---|---|---|---|
| } | | | |
| MP_table_descriptors { | N2 | | |
|   MP_table_descriptors_length | | 16 | uimsbf |
|   for (i=0; i<N2; i++) { | | | |
|     MP_table_descriptors_byte | | 8 | uimsbf |
|   } | | | |
| } | | | |
| } | | | |
| number_of_assets | N3 | 8 | uimsbf |
| for (i=0; i<N3; i++) { | | | |
|   Identifer_mapping( ) | | | |
|   asset_type | | 32 | char |
|   reserved | '1111 11' | 6 | bslbf |
|   default_asset_flag | | 1 | bslbf |
|   asset_clock_relation_flag | | 1 | bslbf |
|   if (asset_clock_relation_flag ==1) { | | | |
|     asset_clock_relation_id | | 8 | uimsbf |
|     reserved | '1111 111' | 7 | bslbf |
|     asset_timescale_flag | | 1 | bslbf |
|     if (asset_time_scale_flag == 1) { | | | |
|       asset_timescale | | 32 | uimsbf |
|     } | | | |
|   } | | | |
|   asset_location { | | | |
|     location_count | N4 | 8 | uimsbf |
|     for (i=0; i<N4; i++) { | | | |
|       MMT_general_location_info( ) | | | |
|     } | | | |
|   } | N5 | 16 | uimsbf |
|   asset_descriptors { | | | |
|     asset_descriptors_length | | | |
|     for (j=0; j<N5; j++) { | | 8 | uimsbf |
|       asset_descriptors_byte | | | |
|     } | | | |
|   } | | | |
| } | | | |
| } | | | |

The semantics of the MP table defined in the MMT standard specifications are as shown in Tables 5, 5B, and 5C below.

TABLE 5

<Semanitics>

*table_id-indicates the identifier of the MP table. A complete MP
table and each subset MP tables shall
use different table identifiers. Subset number of MP table is
implicitly represented by this field. Since the
table_id values are assigned contiguously, the MP table subset
number can be deduced from this field, i.e., the
MP table subset number equals this field minus the table_id
of the base MP table. The MP table subset
number provides the subset number of this MP table, The
number '0' indicates base MP table and the
numbers '1'~'14' indicate subset of MP table. The number '15'
has a special meaning since it indicates a
complete MP table.
*version - indicates the version of the MP table. The newer
version overrides the older one as soon as it is
been received. If table_id indicates a complete MP table,
if Subset-0 MP table has the same version value as
this field (when MP_table_mode is '1') or if all MP table
subsets with lower-subset number have the same
version value as this field (when MP_table_mode is '0'),
or if processing of the MP table subsets are
independent (when MP_table_mode is '2'). If Subset-0 MP
table has a newer version, all MP table subsets with
higher subset number up to 14 previously stored within an
MMT receiving entity are treated as outdated except
for the case when MP_table_mode is independent mode.
When the MP table subset number is not 0 and
MP_table_mode is '1', the contents of the MP table
subset with version different from that of subset-0 MP
table stored in an MMT receiving entity shall be ignored.

TABLE 5-continued

<Semanitics>

Also when the MP table subset number is not 0 and MP table_mode is '0', the contents of the MP table subset with version different from that of lower-subset MP table subsets stored in an MMT receiving entity shall be ignored. It shall be modulo-256 incremented per version change.
 *length - contains the length of the MP table in bytes, counting from the beginning of next field to the last byte of the NIP table. The value '0' is not valid for this field.

TABLE 5B

*MP_table mode - It indicates the mode of an MP table subset processing when MP table subset mechanism is used. In "sequential_order_processing_mode" and with a non-zero subset number of this MP table, an MMT receiving entity shall receive all MP table subsets with lower subset number that have the same version as this MP table subset before it processes this MP table subset. For example, an MMT receiving entity can't process subset-3 MP table, if it has not received subset-2 MP table with the same version. In "order_irrelevant_processing_mode" and with the subset number of this MP table subset set to non-zero. an MMT receiving entity should process an MP table subset right after it receives the MP table subset as long as the subset-0 MP table stored in an MMT receiving entity has the same version as this MP table subset. In "independent_processing_mode", the version of each MP table subset is managed individually. Fragmented MP table where each MP table subset is delivered by one of multiple MMT sending entities is adapted in this mode. The independent mode of subsets of MP table can be used for the multi-channel instantiation, i.e. MP table subsets from subset-0 MP table to subset-N MP table are assigned as logical channels from Ch-O to Ch-N. When an MPI message carries both an MPI table subset and the associated MP table subset, the PI_mode in the MPI table and the MP_table_mode in the MP table shall have the same value.

| Value | Description |
|---|---|
| 00 | "sequential_order_processing_mode" |
| 01 | "order_irrelevant_processing_mode" |
| 10 | "independant_processing_mode" |
| 11 | Reserved |

*MMT_package_id - this field is a unique identifier of the Package.
 *MMT_package_id_length - the length in bytes of the MMT_package_id string, excluding the terminating
null character.
 *MMT_package_id_byte - a byte in the MMT_package_id.
 When the MMT_package_id_byte is string, the
terminating null character is not included in the string.
 *asset_id - provides Asset identifier as defined in 9.6.2.
 *asset_type - provides the type of Asset. This is described in four character code ("4CC") type registered
in MP4REG (http://www.mp4ra.org).
 *MP_table_descriptors - this field provides descriptors for the MP table.

TABLE 5C

*MP_table_descriptors_length - contains the length of the descriptor syntax loop. The length is counted from the next field to the end of the descriptor syntax loop. Several descriptors can be inserted in this syntax loop. For example, additional_package_information_URL descriptor can be included here, which provides the URL of Package information web page for this Package.
 *MP_table_descriptors_byte - one byte in the descriptors loop.
 *number_of_assets - provides the number of Assets whose information is provided by this MP table.
 *packet_id - provides the identifier of the MMTP session in the MMTP packet header.
 *asset_clock_relation_flag - indicates whether an Asset uses NTP clock or other Clock system as the clock reference. If this flag is '1', asset_clock_relation_id field is included. If this field is '0', the NTP clock is used for the Asset
 *asset_clock_relation_id - provides a clock relation identifier for the Asset. This field is used to reference the clock relation delivered by a CRI_descriptor( ) for the Asset. The value of this field is one of the clock_relation_id values provided by the CRI descriptors. (see sub-clause 9.5.1)
 *asset_timescale_flag - indicates whether "asset_timescale" information is provided or not. If this flag is '1', asset_timescale field is included and if this flag is set to '0', asset_timescale is 90,000 (90 kHz).
 *location_count - provides the number of location information for an Asset. Set to '1' when an Asset is delivered through one location. When bulk delivery is achieved, in which MPUs contained in an Asset are delivered through multi-channels, not '1' is set. When one Asset is delivered over multiple locations, an MMT receiving entity SHALL receive all MPUs of the Asset from all indicated locations.
 *asset_timescale - provides information of time unit for all timestannps used for the Asset expressed in the number of units in one second.
 *MMT_general_location_info_for_asset_location - provides the location information of Asset. General location reference information for Asset defined in 9.6.1 is used. Only the value of location_type between '0x00' and '0x06' shall be used for an Asset location.
 *asset_descriptors_length - the number of bytes counted from the beginning of the next field to the end of the Asset descriptors syntax loop.
 *asset_descriptors_byte - a byte in Asset descriptors.

TABLE 5C-continued

*default_asset_flag - indicates whether an Asset is marked as a default asset or not. In case, an asset is marked as a default asset, the MPU timestamp descriptor should be present for the corresponding timed asset. If this flag is '0', the asset is marked as a default asset.

Embodiments of the disclosure are described below with reference to FIG. 3.

Figure 3:
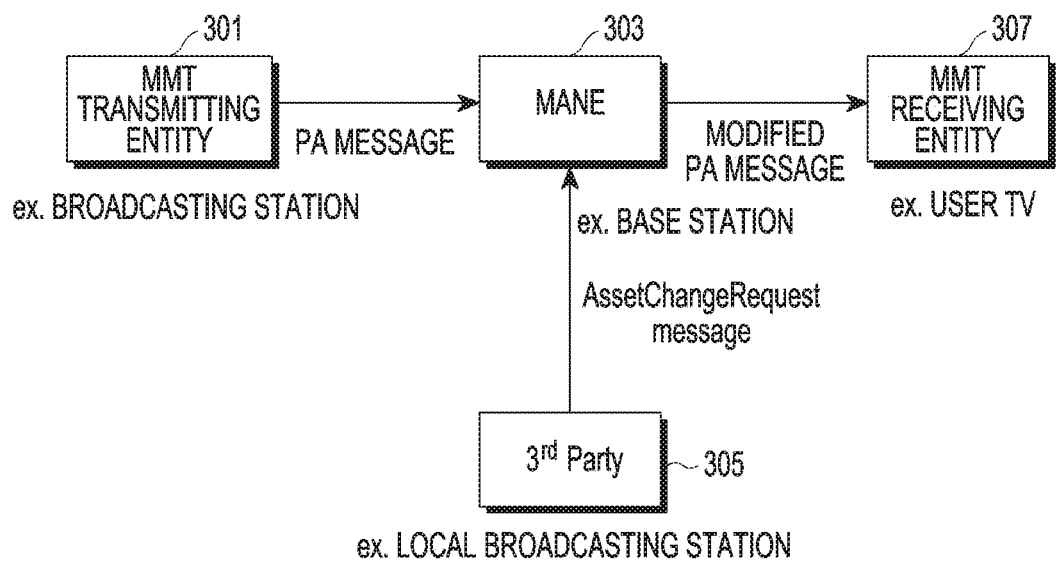
FIG. 3 is a view illustrating an MMT transmission/reception system including a MANE 301 according to an embodiment of the disclosure.

FIG. 3 is a view illustrating an MMT transmission/reception system including a MANE 301 according to an embodiment of the disclosure.

Compared to FIG. 2, FIG. 3 illustrates the presence of a MANE 303 between a transmitting entity 301 and a receiving entity 307. FIG. 3 further illustrates a third MMT transmitting entity (3rd party entity) 305 (hereinafter, simply referred to as a "third entity"), e.g., a local broadcast station. According to an embodiment of the disclosure, the MANE receives a package and a signaling message from the transmitting entity 301. Here, the signaling message contains flag information that indicates modifying a particular asset in the package. The flag information is described below. For reference, the term "package", as used hereinafter, may be interchangeably used with "media content."

The MMT transmitting entity 301 produces MMT-based media content resource information and media content signaling information. Hereinafter, "MMT transmitting entity" may be simply referred to as a "transmitting entity."

The third entity 305 provides separate, MMT-based media content resource information and media content signaling information to allow the content provider or service provider to provide additional services, e.g., targeted advertising for particular users.

The MANE 303 gathers the MMT-based media content resource information, media content signaling information, and the separate MMT-based media content resource information and media content signaling information for providing additional services within the content and business network, updates, e.g., expands or edits, the existing MMT-based media content resource information and media content signaling information, and retransmits the updated information to the receiving entity 307.

The MMT receiving entity 307 receives the MMT-based media content resource information and media content signaling information through the MANE 303, and serves the media content to the user. Hereinafter, "MMT receiving entity" may be simply referred to as a "receiving entity."

The transmitting entity 301 produces MMT-based media content resource information and media content-related signaling information and transmits the information to the receiving entity 307 via the MANE 303 so that the service user can receive his desired information and use the service.

At this time, the content and service provider may provide additional services, e.g., targeted advertising or biased broadcasting, not via the transmitting entity 301 but via the third entity 305. The MANE 303 receives the MMT-based media content resource information and media content signaling information from the transmitting entity 301 and the other MMT-based media content resource information and media content signaling information from the third entity 305 and expands or edits the media content provided from the transmitting entity 301, thereby providing the same to the receiving entity 307.

At this time, to provide an additional service, the content and service provider puts a message for the additional service in the media content-related signaling information transmitted from the transmitting entity 301 or adds information for the additional service to the MMT signaling message, e.g., PA message, defined in the existing MMT signaling message and provides the same to the MANE 303, thereby allowing the MANE 303 to perform operations related to the additional service. As an example, an "asset_modification_flag" may be included in the MP table within the PA message of the MMT signaling message, according to the disclosure. As another example, an "asset_modification_flag" may be included in a particular signaling message to carry the list information of all the assets constituting the package. The "asset_modification_flag" is a field able to indicate that a particular asset in the package is modified. The "asset_modification_flag" is described below in greater detail.

Meanwhile, to request the third entity 305 to provide the additional service to the user via the MANE 303, there is a defined signaling message requesting to modify/replace/overlay at least part of the media content that the MANE receives from the transmitting entity 301 into/with/on the media content for the additional service. In this disclosure, this message is defined as an "asset change request (ACR)" message, which is described below in detail.

In other words, the third entity 305 transfers the media content signaling information and the media content resource information for the additional service to the MANE 305 via the "AssetChangeRequest" message. The third entity 305 may request to modify particular assets of the assets in the package that the transmitting entity 301 transmits or to insert, replace, or overlay the particular assets with other media content by transferring the asset change request_message to the MANE 303.

To modify/insert/replace/overlay the particular assets, the third entity 305 provides a package identifier (package_id), asset identifier (asset_id), or other resource information, thereby requesting the MANE 303 to modify/insert/replace/overlay the resource for the additional service for the particular assets. Hereinafter, "modify/insert/replace/overlay" may collectively be referred to as "modify/replace."

In an additional embodiment, the user's property information (e.g., user_preference_info), such as their gender or age, may be transmitted to the MANE 303 in the asset change request message. The user's property information may be used to provide a targeted service suited for the users corresponding to the user property information. In other words, upon receiving the user property information, the MANE 303 may transmit the user property information to the service provider while requesting an additional service (e.g., a targeted service) for the users corresponding to the property information.

Meanwhile, upon receiving the asset change request message, the MANE 303 updates the MP tables in all the PA messages related to the change-requested asset based on the asset change request message and transmits the updated result to the receiving entity 307. At this time, the "asset_modification_flag" in the MP tables may be set to 1, indicating that the asset has been modified/replaced. Further, upon receiving the asset change request message, the MANE 303 may update the particular signaling message to carry the list information of all the assets constituting the package based on the asset change request message and transmit the updated result to the receiving entity 307. At this time, the MANE 303 may set the "asset_modification_flag" in the particular signaling message carrying the list information of all the assets constituting the package to 1, thereby indicating that the asset has been modified/replaced. In other words, the MANE 303 modifies the MMT-based content resource information and media content-related signaling information received from the transmitting entity 301 using the asset change request information received through the third entity 305 and provides the modified MMT-based content resource information and media content signaling information to the receiving entity 307, i.e., the service user, thereby providing the additional service to the user.

The content and service provider may provide the additional service, e.g., targeted advertising or biased broadcasting, via the transmitting entity 301. The MANE 303 receives the MMT-based media content resource information and media content signaling information from the transmitting entity 301 and the other MMT-based media content resource information from the third entity 305 and expands or edits the media content provided from the transmitting entity 301, thereby providing the same to the receiving entity 307.

That is, the transmitting entity 301 transfers the media content resource information, which the third entity 305 has, to the MANE 305 through the "AssetChangeRequest" message. The third entity 301 may request to modify particular assets of the assets in the package that the transmitting entity 301 transmits or to insert, replace, or overlay the particular assets with other media content by transferring the asset change request_message to the MANE 303.

To modify/insert/replace/overlay the particular assets, the transmitting entity 301 provides a package identifier (package_id), asset identifier (asset_id), or other resource information, thereby requesting the MANE 303 to modify/insert/replace/overlay the resource for the additional service for the particular assets. Hereinafter, "modify/insert/replace/overlay" may collectively be referred to as "modify/replace."

Meanwhile, upon receiving the asset change request message, the MANE 303 updates the MP tables in all the PA messages related to the change-requested asset based on the asset change request message and transmits the updated result to the receiving entity 307. At this time, the "asset_modification_flag" in the MP tables may be set to 1, indicating that the asset has been modified/replaced.

Further, upon receiving the asset change request message, the MANE 303 may update the particular signaling message to carry the list information of all the assets constituting the package based on the asset change request message and transmit the updated result to the receiving entity 307. At this time, the MANE 303 may set the "asset_modification_flag" in the particular signaling message carrying the list information of all the assets constituting the package to 1, thereby indicating that the asset has been modified/replaced.

In other words, the MANE 303 modifies the MMT-based content resource information and media content-related signaling information received from the transmitting entity 301 using the asset change request information received through the transmitting entity 301 and provides the modified MMT-based content resource information and media content signaling information to the receiving entity 307, i.e., the service user, thereby providing the additional service to the user.

The receiving entity 307 may render the media content to provide the additional service as per the updated MP table. If rendering the additional service is terminated, the MANE restores the MP table updated based on the asset change request message with the MP table received from the transmitting entity 301 and sends the same back to the receiving entity 307, providing the original media content to the receiving entity 307.

Figure 4:
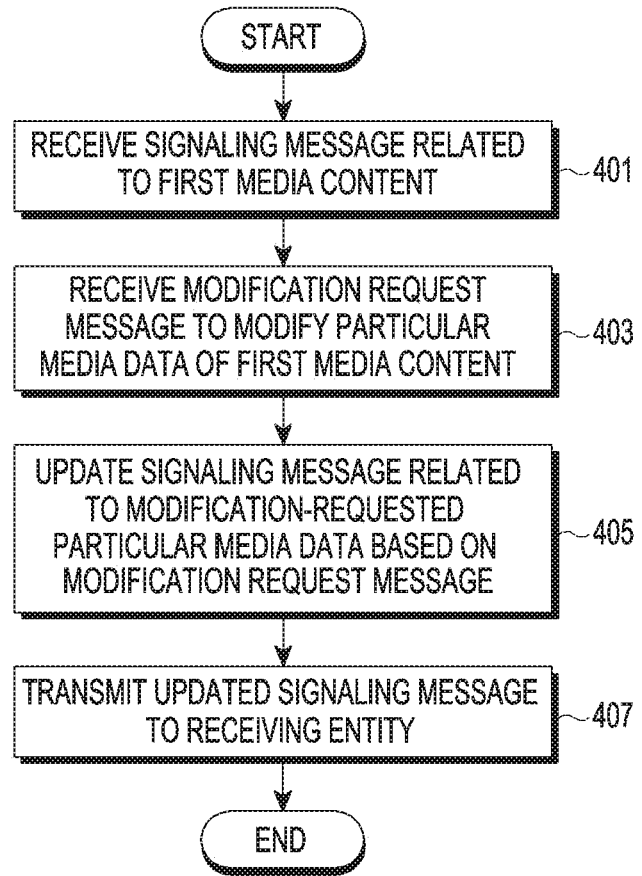
FIG. 4 is a view illustrating basic operations of a MANE according to an embodiment of the disclosure.

FIG. 4 is a view illustrating basic operations of a MANE according to an embodiment of the disclosure.

In step 401, a signaling message related to the first media content is received from the transmitting entity 301. For reference, the transmitting entity 301 may directly transmit the first media content to the MANE 303. Further, unless the first media content is directly transmitted to the MANE 303, location information of the media content may be included in the MP table, allowing the MANE 303 or receiving entity 307 to implement the first media content. Meanwhile, the "asset_modification_flag" is newly defined in the MP table of the signaling message, according to the disclosure.

In step 403, a modification request message is received to modify particular media data of the first media content. The modification request message contains the particular message-related information and information related to second content to be provided to the user. In this disclosure, an asset change request message is defined as the modification request message.

In step 405, the signaling message related to the particular media data requested to be modified is updated based on the modification request message.

In step 407, the updated signaling message is transmitted to the receiving entity 307.

Meanwhile, the MANE 303 may not only update the signaling message related to the particular media data requested to be modified in step 405 but directly modify the modification-requested particular media data of the first media content into the second content as well. At this time, the MANE 303 transmits not only the updated signaling message, but also the first media content, which has been modified from the particular media data based on the modification request message, to the receiving entity 307 in step 407.

Figure 5A:
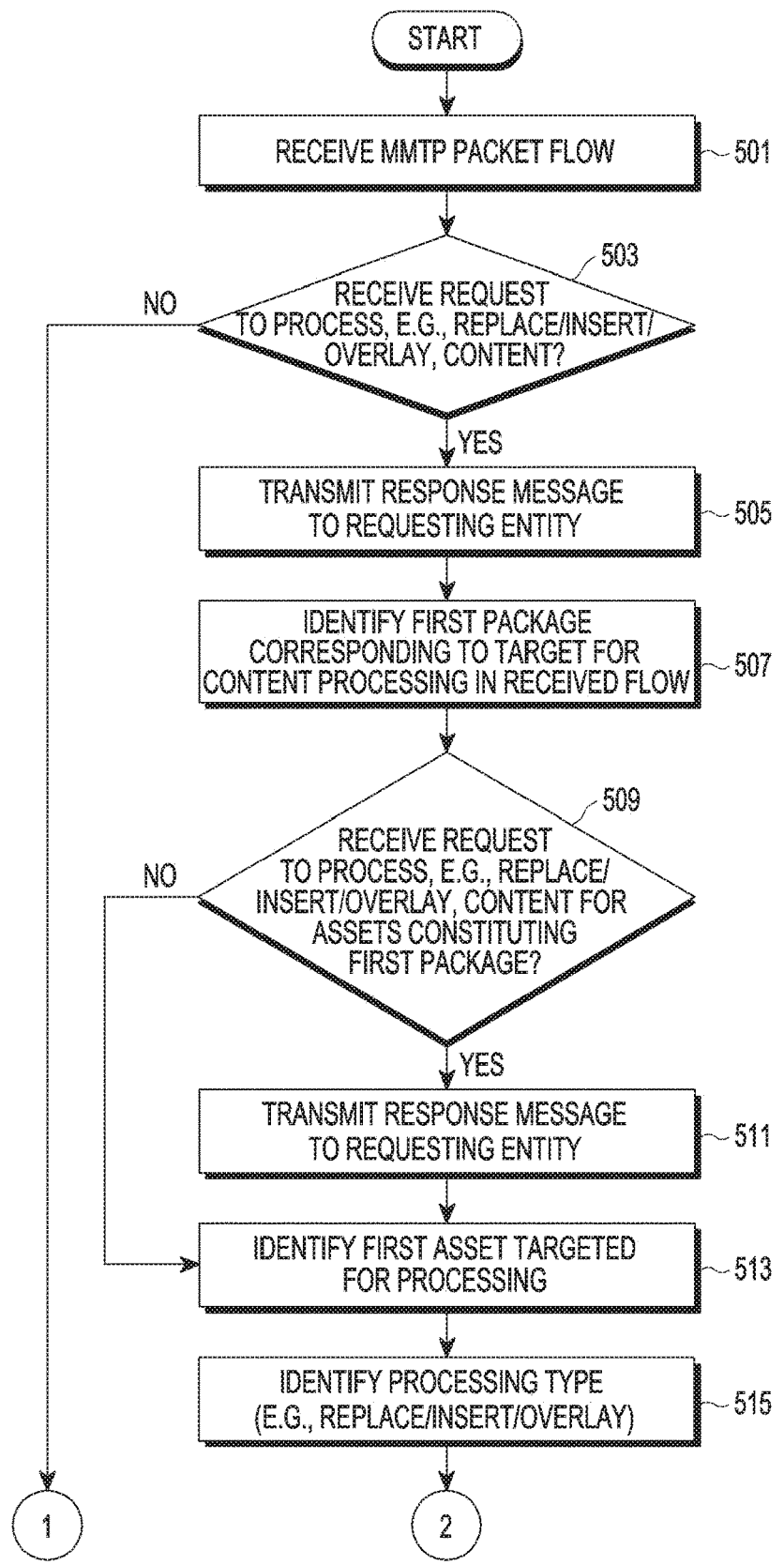
FIGS. 5a and 5b are views illustrating detailed operations of a MANE according to an embodiment of the disclosure.
Figure 5B:
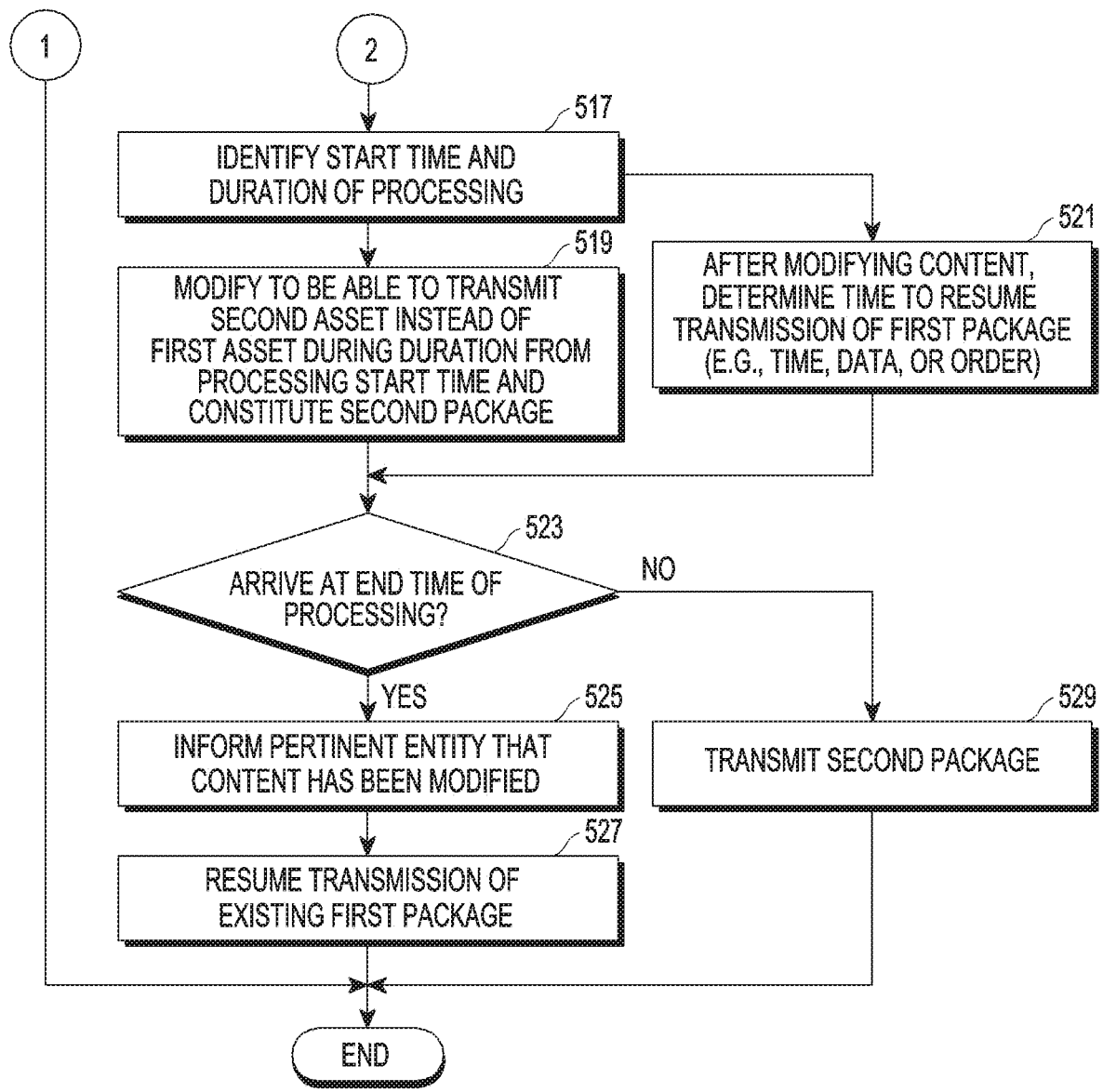

FIGS. 5a and 5b are views illustrating detailed operations of a MANE according to an embodiment of the disclosure.

FIGS. 5a and 5b are shown on two sheets due to the sheet size although they are intended to be a single view.

In step 501, the MANE receives an MMTP packet flow. In step 503, the MANE determines whether a request to process, e.g., replace/insert/overlay, content, has been received. For example, the MANE determines whether it has received a particular signaling message to carry the list information of all the assets constituting the package containing the "asset_modification_flag" or the PA message containing the MP table containing the "asset_modification_flag", i.e., the flag information indicating that a particular asset may be modified/replaced. Without receiving the processing request, the procedure terminates. Upon receiving the processing request, the procedure goes to step 505, transmitting a response message to the entity having transmitted the processing request. For reference, step 505 may be omitted depending on the configuration of the MMT system.

Thereafter, in step 507, the MANE identifies the first package corresponding to the target for content processing in the received MMTP flow. In step 509, the MANE determines whether it has received a request to process, e.g., replace/insert/overlay, content for the assets constituting the first package. Upon receiving the processing request, the MANE goes to step 511, transmitting a response message to the requesting entity and identifying the first asset, which is the target for processing, in step 513. Without receiving the processing request, the MANE immediately goes to step 513. For reference, step 511 may be omitted depending on the configuration of the MMT system.

Meanwhile, in step 515, the type of processing request is identified. That is, whether the processing request is replace/insert/overlay is identified. In step 517, the MANE identifies the start time and duration of processing. Thereafter, in step 519, the MANE modifies/replaces the first package to constitute the second package to be able to send the second asset instead of the first asset during the processing duration from the processing start time. For reference, in constituting the second package by modifying/replacing the first package to send the second asset instead of the first asset in step 519, the MANE may modify the portion related to the first asset in the MMT signaling message related to the first package to be related to the second asset, thereby defining the same as the second package-related MMT signaling message.

Meanwhile, in step 521, the MANE processes the modification/replacement of the content and then determines the time to resume the transmission of the first package. In step 523, the MANE determines whether the processing end time has arrived, and if so, goes to step 525, informing the relevant entity that the modification/replacement of the content has terminated. Unless the processing end time has arrived, the MANE goes to step 529, sending out the second package. Meanwhile, in step 527, the MANE resumes the prior first package transmission.

Thereafter, when the request to modify the additional service is terminated based on the asset change request message received from the third entity 305 or the transmitting entity 301 or the additional service is not provided any longer, it is transferred to the receiving entity 307 based on the MMT-based content resource information and media content signaling information received from the transmitting entity 301 and stored in the MANE 303, thereby providing the media content service.

As set forth above, the multimedia transmission system according to an embodiment of the disclosure may modify/replace, in-real time, the video/audio assets constituting the service depending on the provider's intent.

In the multimedia transmission system according to an embodiment of the disclosure, the transmitting entity 301 continuously transfers the original assets to the MANE 303, and the third entity 305 transfers "at least one asset to replace the original assets" (hereinafter, simply referred to as "replacement assets") to the MANE 303 during a particular time period. At this time, the replacement assets that the third entity 305 has transferred are used to replace the original assets in the MANE 303 or the receiving entity 307.

When the MANE 303 replaces the original assets using the replacement assets, the MANE 303 may replace the MPUs constituting the original assets with the MPUs constituting the replacement assets or add the replacement assets as a new component of the package.

When the replacement is performed in MPU units, the MPUs constituting the replacement assets may be packetized into MMTP packets in the MANE 303. At this time, information of the MMTP packet headers may be reset in the MANE 303 for continuity. The reset information may be at least one of a "timestamp," "packet_sequence_number," and "packet_counter."

When the MANE 303 adds the replacement assets as a new component for the package, the MANE 303 generates signaling information to inform the receiving entity 307 of the same. At this time, the signaling information contains at least one of information about the replacement assets and information about the relationship between the replacement assets and the original assets.

When the receiving entity 307 replaces the original assets using the replacement assets, the MANE 303 adds the replacement assets as a new component for the package and produces signaling information to inform the receiving entity 307 of the same and transfers the signaling information to the receiving entity 307. At this time, the signaling information contains at least one of information about the replacement assets and information about the relationship between the replacement assets and the original assets. Meanwhile, according to another embodiment of the disclosure, the replacement assets may be transferred from the third entity 305 directly to the receiving entity 307 without passing through the MANE 303.

In the multimedia transmission system according to an embodiment of the disclosure, the original assets may be buffered in the transmitting entity 301, the MANE 303, or the receiving entity 307 during the time period when the replacement assets should be played. At this time, the MANE 303 may reset the MMTP packet header information or signaling information to continuously provide the service after the buffering time. The reset MMTP packet header information contains at least one of a "timestamp," "packet_sequence_number," and "packet_counter." Further, the reset signaling information contains at least one of a "PA message" and an "MP table."

In an embodiment of the disclosure, the transmitting entity 301 may indicate which ones of the assets in one package, which the transmitting entity 301 transmits, are replaced by the third nodes and rendered by the user. In an embodiment of the disclosure, the information may be included in a particular signaling message to carry all the assets constituting the package or the MP table in the PA message, and the information is called an "asset_modification_flag", which is flag-type, one-bit information. The assets for which the asset_modification_flag has been set to '1' are permitted to be replaced by the MANE 303 or other third nodes, and the assets for which the asset_modification_flag has been set to '0' are not permitted to be replaced by the MANE 303 or the third nodes.

The syntax of the MP table in the PA message suggested according to an embodiment of the disclosure is shown in Tables 6 and 7 below. Tables 6 and 7 are shown on two sheets due to the limited sheet size although they are intended to be a single table.

TABLE 6

| Syntax | Value | No. of bits | Mnemonic |
|---|---|---|---|
| MP_table( ) { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   if ((table_id == 0x10 or | | | |
|   (table_id == 0x11)) | | | |
|   {MMT_package_id { | N1 | | |
|     MMT_package_id_length | | 8 | uimsbf |
|     for (i=0; i<N1; i++) { | | | |
|       MMT_package_id_byte | | 8 | uimsbf |
|     } | | | |
|   } | | | |
| } | | | |

TABLE 7

| | | | |
|---|---|---|---|
| MP_table_descriptors{ | N2 | | |
| MP_table_descriptors_length | | 16 | uimsbf |
| for (i=0; i<N2; i++) { | | | |
| MP_table_descriptors_byte | | 8 | uimsbf |
| } | | | |
| } | | | |
| } | N3 | | |
| Number_of_assets | | 8 | uimsbf |
| for (i=0; i<N3; i++) { | | | |
| Identifier_mapping() | | | |
| asset_type | | 32 | Char |
| | '1111 11' | | |
| reserved | | 6 | bslbf |
| default_asset_flag | | 1 | bslbf |
| asset_clock_relationilag | | 1 | bslbf |
| asset_modification_flag | | | |
| if (asset_clock_relation_flag = = 1) | | | |
| { | | | |
| | '1111 111' | | |
| asset_clock_relation_jd | | 8 | uimsbf |
| reserved | | 7 | bslbf |
| asset_timescale_flag | | 1 | bslbf |
| if (asset_clock_scale_flag = = 1) { | | | |
| asset_timescale | | 32 | ulmsbf |
| } | | | |
| } | N4 | | |
| asset_location { | | | |
| location_count | | | |
| for (i=0; i<N4; i++) { | | | |
| MMT_general_location_info () | | 8 | uimsbf |
| } | | | |
| } | N5 | | |
| asset_descriptors { | | | |
| asset_descriptors_length | | 16 | uimsbf |
| for (i=0; i<N5; i++) { | | | |
| asset_descriptors_byte | | 8 | uimsbf |
| } | | | |
| } | | | |
| } | | | |
| } | | | |

The semantics of the MP table are as set forth in Table 5 above. However, in this disclosure, the "asset_modification_flag" set forth in Table 7 is newly suggested.

*asset_modification_flag: indicates whether the corresponding Asset can be replaced, modified, or changed by some 3$^{rd}$ party entities at some entity such as MANE when rendered to MMT receiving entities. (asset_modification_flag—indicates whether the corresponding Asset can be replaced, modified, or changed by some 3$^{rd}$ party entities at some entity such as MANE when rendered to MMT receiving entities.)

Meanwhile, "AssetChangeRequest_message", which is newly suggested in the disclosure, is a message that the third entity 305, e.g., a local broadcast station, transmits to the MANE 303, requesting to modify/insert/replace/overlay at least one particular asset among the assets in one package that the transmitting entity 301, e.g., a local broadcast station, transmits. Receiving the AssetChangeRequest_message, the MANE 303 updates the particular signaling message to carry all the assets constituting the package or the MP tables in all the PA messages containing the information about the particular asset based on the AssetChangeRequest_message. By so doing, rendering may be performed in such a manner that the MPU with a particular number or time indicated in the AssetChangeRequest_message transmitted from the third local broadcast station is modified/inserted/replaced/overlaid with other third media content, among such assets as broadcast programs that the broadcast station has transmitted.

The "AssetChangeRequest_message" is a message that the transmitting entity 301, e.g., the broadcaster communicating with the third entity 305, e.g., a local broadcast station, transmits to the MANE 303, requesting to modify/insert/replace/overlay at least one particular asset among the assets in one package that the transmitting entity 301, e.g., a local broadcast station, transmits. Receiving the AssetChangeRequest_message, the MANE 303 updates the particular signaling message to carry all the assets constituting the package or the MP tables in all the PA messages containing the information about the particular asset based on the AssetChangeRequest_message. By so doing, rendering may be performed in such a manner that the MPU with a particular number or time indicated in the AssetChangeRequest_message transmitted from the broadcast station is modified/inserted/replaced/overlaid with other third media content, among such assets as broadcast programs that the broadcast station has transmitted.

The syntax of the "AssetChangeRequest_message" is as shown in Table 8 below.

TABLE 8

| Syntax | Value | No. of bits | Mnemonic |
|---|---|---|---|
| AssetChangeReqeust_message () { | | | |
| message_id | | 8 | uimsbf |
| version | | 8 | ulmsbf |
| length | | 16 | uimsbf |
| reserved | '11 1111' | 6 | bslbf |
| number_of_assets | | 2 | bslbf |
| for (i=0; i<N3; i++) { | | | |
| Target_MMT_package_id { | N1 | | |
| MMT_package_id_length | | 8 | ulmsbf |
| for (i=0; i<N1; i++) { | | | |
| MMT_package_id_byte | | 8 | ulmsbf |
| } | | | |
| } | | | |
| } | | | |
| Target_asset _id { | N2 | | |
| asset_id_scheme | | 16 | ulmsbf |
| asset_id_ length | | 8 | uimsbf |
| for (j=0; j<N2; j++) { | | | |
| asset_id_byte | N3 | 8 | ulmsbf |
| } | | | |
| } | | | |
| Target_asset_type | | | |
| Change_Time_indicator | | | |
| Change_Type | | 32 | char |
| Change_Indicate_Mode | '1111 11' | 6 | bslbf |
| Target_MPU_id () { | I | | |
| Mpu_sequence_number | 1 | | |
| }Designated_source_URL | | | |
| } | | | |
| } | | | |

The semantics of the "AssetChangeRequest_message" is as shown in Table 9 below.

TABLE 9

*Target_MMT_Package_ID - indicates the package
the target assets to be modified belongs to.
*Target_asset_ID - indicates the target asset to be modified.
*Target_asset_type - indicates the target asset type,
such as Video, Audio. This is described in
four character code ("4CC") type registered in
MP4REG (http://www.mp4ra.org).
*(Change_Time_Indicator - a time at which the media
change happens. The unit of this field is
in milliseconds.

TABLE 9-continued

*Duration - indicates the change time duration from the Change_Time_Indicator
*Change_Type - a type at which the media change happens. Type is as follows;

| Type | Description |
|---|---|
| 0x01 | Replace the target asset with designated Asset |
| 0x02 | Overlay the target asset with designated Asset |
| 0x03~ | reserved |

*Change_Indicate_Mode - a mode at which the media change happens. In case of 0x02, it is argumented with MPU sequence_number.

| Type | Description |
|---|---|
| 0x01 | Change based on time |
| 0x02 | Change based based on MPU ID |
| 0x03~ | reserved |

*MPU_sequence_number - contains the sequence number of the current MPU;
*Designated_source_URL- contains the location of original designated asset that is going to be inserted/modified.

Referring to Table 9 above, the "AssetChangeRequest_message" may include at least one of the ID of the MMT packet to be replaced (Target_MMT_Package_ID), the ID of the MMT asset to be replaced (Target_asset_ID), the type of the replaced asset (Target_asset_type), information about the time when the media change occurs (Change_Time_Indicator), information about the duration of the media change (Duration), information as to, e.g., whether the type of media change is replace or overlay (Change_Type), information about whether the mode in which the media change occurs is time-based or MPU ID-based (Change_Indicate_Mode), information about the sequence number of the MPU in case it is MPU ID-based (MPU_sequence_number), and information about the position of the original one of the designated asset to be inserted/replaced (Designated_source_URL).

Receiving the AssetChangeRequest_message, the MANE 303 updates the particular signaling message to carry all the assets constituting the package or the MP table in the PA message related to the targeted asset and transmits an ACK message to the transmitting entity 301 or the third entity 305 which has transmitted the AssetChangeRequest_message. At this time, the operation of transmitting the ACK response message may be omitted depending on the MMT system. The particular signaling message to carry all the assets constituting the updated package or the updated PA message is transmitted to the receiving entity 307.

Meanwhile, the MANE 303 updates the particular signaling message to carry all the assets constituting the package or the MP table in the PA message in the following order.

(1) The MANE 303 calculates and readjusts the MPU timestamp descriptor containing the presentation time information of each MPU based on the "Change_Time_indicator" contained in the AssetChangeRequest_message.

(2) The MANE 303 updates the URL of the original content to be inserted to the target asset using the "Designated_source_URL" contained in the AssetChangeRequest_message.

If the particular signaling message to carry all the assets constituting the package or the MP table in the PA message is updated and transmitted to the receiving entity 307, and the modification/insertion/replacement/overlay for the target content is complete, the MANE 303 may restore the particular signaling message to carry all the assets constituting the package or the MP table in the original PA message before update and transmits the restored message to the receiving entity 307, thus allowing the receiving entity 307 to receive the original content that the transmitting entity 301 has transmitted.

For reference, the MANE 303 receives the AssetChangeRequest_message, accordingly updates the MP table of the PA message, and transmits the same to the receiving entity 307. Since the receiving entity 307 plays media according to the PA message, the operation of modifying/replacing the media, which the transmitting entity 301 provides, with the additional service, which the third entity 305 provides, may be performed not by the MANE but by the receiving entity.

The operation of modifying/replacing the media, which the transmitting entity 301 provides, with the additional service, which the third entity 305 provides, may be performed by the MANE.

Figure 6:
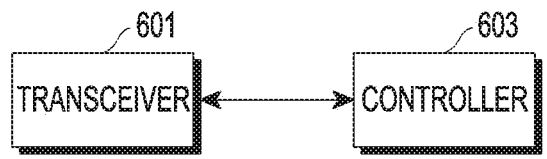
FIG. 6 is a view illustrating a configuration of a MANE according to an embodiment of the disclosure.

FIG. 6 is a view illustrating a configuration of a MANE according to an embodiment of the disclosure.

A transceiver 601 transmits and receives media content and messages with an external entity. For example, in this disclosure, the transceiver 601 receives first media content and first media-related signaling messages. Further, the transceiver 601 receives a modification request message to modify particular media data of the first media content.

A controller 603 updates the signaling message related to the particular media data requested to be modified based on the modification request message. Further, the controller 603 may update the particular media data of the first media content, which is requested to be modified, based on the modification request message. The updated signaling message and media content are transmitted to the receiving entity 307 via the transceiver 601.

Figure 7:
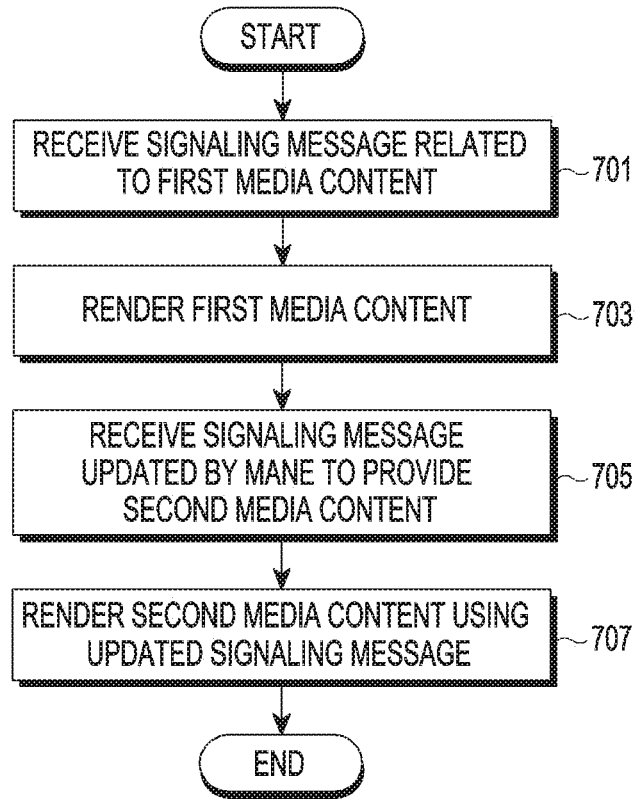
FIG. 7 is a view illustrating operations of a receiving entity according to an embodiment of the disclosure.

FIG. 7 is a view illustrating operations of a receiving entity according to an embodiment of the disclosure.

The receiving entity receives a signaling message related to first media content in step 701 and renders the first media content based on the signaling information in step 703.

The receiving entity receives the updated signaling message from the MANE to provide second media content in step 705 and renders the second media content using the updated signaling message in step 707.

For reference, when the MANE updates not only the signaling message, but also the first media content, into the second media content, the signaling message and second media content updated in the MANE are received in step 705, and the second media content is rendered using the updated signaling message in step 707.

Figure 8:
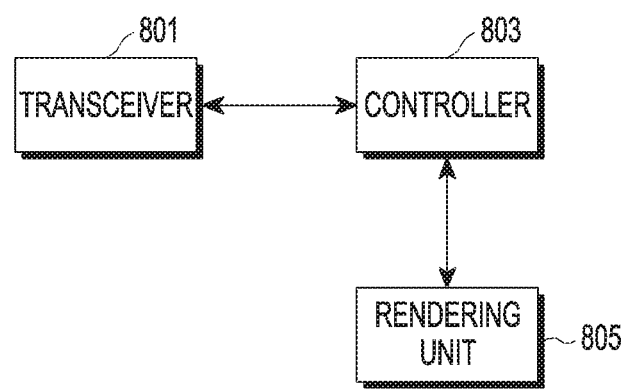
FIG. 8 is a view illustrating a configuration of a receiving entity according to an embodiment of the disclosure.

FIG. 8 is a view illustrating a configuration of a receiving entity according to an embodiment of the disclosure.

A transceiver 801 transmits and receives messages with an external entity. For example, the transceiver 801 receives a signaling message related to first media content and receives an updated signaling message from the MANE to provide second media content. As another example, to provide the second media content, the transceiver 801 receives the second media content and the signaling message updated in the MANE.

A controller 803 controls operations of the receiving entity. A rendering unit 805 renders the first media content based on the signaling message and the second media content using the updated signaling message.

Embodiments of the disclosure have been described above. The second content may be efficiently provided while the first content is provided to the receiving entity using the newly proposed "AssetChangeRequest_message" and the "asset_modification_flag" contained in the MP table of the PA message or the newly proposed MMT signaling message according to the disclosure.

Particular aspects of the disclosure may be implemented as computer readable codes in a computer readable recording medium. The computer readable recording medium is a data storage device that may store data readable by a computer system. Examples of the computer readable recording medium may include read only memories (ROMs), random access memories (RAMs), CD-ROMs, magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the disclosure may be readily interpreted by skilled programmers in the art to which the disclosure pertains.

The apparatuses and methods according to embodiments of the disclosure may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer). The methods according to embodiments of the disclosure may be implemented by a computer or a portable terminal including a controller and a memory, and the memory may be an exemplary machine-readable storage medium that may properly retain program(s) containing instructions for implementing the embodiments of the disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the disclosure may receive the program from a program providing device wiredly or wirelessly connected thereto and store the same. The program providing apparatus may include a memory for storing a program including instructions enabling a program processing apparatus to perform a preset content protection method and information necessary for the content protection method, a communication unit for performing wired or wireless communications with a graphic processing apparatus, and a controller transmitting the program to the transmitting/receiving device automatically or as requested by the graphic processing apparatus.

Second Disclosure

In conventional broadcast systems, service lists, e.g., electronic service guides (ESGs), are directly created by a particular broadcaster (e.g., KBS or MBC) and sent alongside content, or are produced and distributed to users by paid retransmission providers, such as multichannel video programming distributors (MVPDs) (e.g., SK broadband or Olleh KT) who receive content from the broadcaster and redistribute the content. In other words, users only receive ESGs that are created and distributed by a particular retransmission provider or terrestrial broadcasters to which they subscribe, and choose their desired broadcast programs or obtain information about future programs based on the received ESGs.

Recently, broadcast contents have been often provided in the form of IP-based Internet streams. If this trend continues and all broadcast contents are created as IP-based with the advent of, e.g., an all-IP era, then broadcast channels are expected to increase in number nearly indefinitely, unlike in the traditional method whereby broadcasting occurs with a fixed number of broadcast channels. This leads to the need for a scheme which can efficiently provide ESGs that various providers create.

With the explosive growth of wired/wireless Internet markets, we will see a diversity of Internet television platforms become a meaningful part of our lives. Among others, mobile data traffic will drastically increase. 80% of mobile data traffic is expected to stem from smartphones, with about 60% of all mobile data traffic around the year 2020 being mobile video traffic.

Indeed, the South Korea-Russia World Cup match on Jun. 18, 2014 is a good example of how powerful mobile broadcasting works. As the game was held during the morning rush hour of the day and a tremendous number of viewers flooded into high-definition live services that Naver and Daum provided, mobile data traffic soared as well. Thus, viewing on smartphones couldn't be seamless.

Increasing demand for live broadcast on mobile terminals has led mobile communication carriers to need to efficiently manage mobile traffic while developing relevant additional services.

Upon generating media content, conventional hypertext transfer protocol (HTTP)-based streaming schemes produce media resource distinction information along with metadata. In such cases, upon converting into HTTP-based files to stream out, e.g., 10 minute-long media content over the Internet, information about the content server which is able to receive the media content is stored in the metadata in the form of, e.g., a uniform resource locator (URL), and the same is transmitted together on the receiver part.

The receiver receives the metadata and sends a request for the user's desired streaming service to the HTTP-based media content server through the media resource information (e.g., URL) stored in the metadata.

In the contents delivery network (CDN) environment, when one multimedia receiver and one multimedia transmitter initiate a session through one network and server and provide multimedia service depending on the network condition of the service provider, such a case may occur in which it is required to change the transmission server or session to continue the multimedia service, depending on the requirements of the receiver or transmitter.

Conventional streaming-based HTTP schemes, upon generating media content, produce media resource information along with metadata. Such schemes bring about various issues in the environment to use dynamic media resource distinction information in the actual real-time streaming environment.

First, media resource information, which conventional HTTP schemes adopted, e.g., URL information, do not take advantage of the actual address, e.g., Internet protocol (IP) address, of the media content server and, to access the server, they are thus required to find the actual address by requesting, e.g., the domain name server (DNS), thus causing a delay.

Further, the address of the server is created along with the content during a predetermined file period, making it impossible to update, in realtime, the media resource information due to the dynamic channel change—this renders it difficult to make dynamic channel and media content sever modifications in one program while using the streaming service in practice.

Lastly, when the address of the media content server is modified while in the conventional HTTP-based streaming service, the service currently being used cannot last, and serving on the media content server requires re-reception of the address of the media content server via the initial access process.

Since the conventional CDN-adopting multimedia service environment also produces a media resource together with metadata upon creating media content, the conventional CDN environment had difficulty in dynamic media resource allocation that varies the transmission server and session depending on the requirements of the receiver or transmitter in the realtime streaming environment.

Meanwhile, the above-described information is provided only as background information for a better understanding of the disclosure. No determinations and claims are made as to whether what has been described in this section may be applicable as the prior art related to the disclosure.

According to an embodiment of the disclosure, there is provided a method and device for providing user-centered, integrated broadcast service information in a broadcast system.

According to an embodiment of the disclosure, there is provided a method and device for providing location information of a broadcast service to provide broadcast service information in a broadcast system.

According to an embodiment of the disclosure, there is provided information that is contained in a program constituting channels depending on the type of broadcast channels in a broadcast system.

According to an embodiment of the disclosure, there is proposed a device and method for transmitting/receiving content-related information in a multimedia system.

According to an embodiment of the disclosure, there is proposed a device and method for managing media resources based on service circumstances in a multimedia system.

According to an embodiment of the disclosure, there is proposed a device and method for efficiently managing media resources by providing media content signaling information and media content resource information depending on service circumstances (e.g., the number of users) when providing a media content service, actually and in realtime, by providing dynamic media resource distinction information appropriate for, e.g., the number of service users, user environment, or location, in an existing static media resource allocation environment using a MPEG media transport (MMT)-based media content streaming service.

Hereinafter, embodiments of the disclosure are described. The embodiments of the disclosure are described for MPEG media transport (MMT) broadcast systems. This is merely for ease of description purposes and should not be interpreted as limiting the disclosure to MMT broadcast systems.

FIG. 9 is a view illustrating the concept of providing broadcast service information according to an embodiment of the disclosure.

According to the disclosure, broadcast service information is provided to users in the form of a single piece of integrated broadcast service information using a plurality of pieces of broadcast service information. Referring to FIG. 9, broadcast service information pieces 921, 922, and 923 created by different operators may be integrated into a standardized service list descriptor 924 by an MMT entity 925 and may then be transferred to a service provider via a lower layer. This may prevent the broadcast service information from depending upon a particular broadcaster. Further, terminals, albeit unable to directly receive broadcast service information through broadcast channels, may provide their users with desired broadcast service information. Hereinafter, embodiments of the disclosure are described.

Hereinafter, the terms "(MMT) service descriptor," "(MMT) service list descriptor," and "descriptor" may be interchangeably used as having the same meaning.

FIG. 10 is a view illustrating an MMT service descriptor data model according to an embodiment of the disclosure.

Referring to FIG. 10, one MMT service descriptor 1010 includes a plurality of MMT channels 1011, 1012, 1013, . . . , and one MMT channel includes a plurality of MMT packages 1021, 1022, 1023, 1024, . . . One package corresponds to one content program (e.g., a TV show, news, or baseball game). One MMT channel corresponds to an aggregation of a plurality of broadcast content programs (e.g., MBC, SBS, Netflix, or Hulu).

One MMT service descriptor may be provided by a particular broadcaster. Or, the particular broadcaster may provide a plurality of MMT service descriptors. An MMT receiving entity may obtain location information (e.g., a URL) about the descriptor determined by the provider and may obtain the MMT service list descriptor from the URL. The URL may exist in the MMT transmitting entity and be provided from the MMT transmitting entity to the MMT receiving entity, or the URL may exist in a separate server to provide the MMT service list descriptor and be provided to the MMT receiving entity.

At this time, the MMT channel may be a linear broadcast channel or a non-linear broadcast channel. The linear broadcast channel refers to a channel consisting programs already scheduled for broadcast. For the linear broadcast channel, one package adds time property information of the particular time when the package broadcasts. For example, the package may include the property information of the start time (StartTime) and end time (EndTime) of the broadcast of the package.

The MMT receiving entity may obtain MMT service list descriptors including lists of MMT services from a plurality of sources (descriptor URLs) and, when the obtained MMT service list descriptors are merged and provided to the user, the information provided to the user may play the role of a sort of ESG.

That is, the MMT service list descriptor serves to provide information about the MMT service that a certain service provide provides in the form of an MMT protocol. One MMT service list descriptor consists of a plurality of MMT channels, which are logical units each formed of an aggregation of a plurality of MMT packages. MMT package corresponds to a particular program, such as news, a sports game, or a movie, and one MMT package has its unique ID property value called an MMT package identifier (MMT_Package_id) to differentiate from other MMT packages. When a particular MMT package is chosen, the MMTP session may be provided through a separate SDP file (SDP URI element provides location information), an "in-lined SDP" (the CDATA field in the Descriptor XML document provides information) embedded in the descriptor, an MMT PA message, and an MMT PA table (MMT_PA_URL element provides information). When some channel is constituted of linear contents, each MMT package has its unique property property value, such as startTime and endTime.

The MMT service descriptor schema is described below.

An MMT service consists of package units, and one package includes a plurality of assets. One broadcast channel may be formed of an aggregation of a plurality of packages, and a list of the packages may be provided to the user as service list (i.e., a sort of EPG) information.

Tables 10 and 11 below present an example of the MMT service descriptor schema. Tables 10 and 11 are shown on two sheets due to the limited paper size although they are intended to be a single table.

TABLE 10

```
<?xml version="1.0" encoding="UTF-8"?>
<xs:schema xmins:xs="http://www.w3.org/2001/XMLSchema"
elementFormDefault="unqualified" version="1.0">
    <xs:element name="MMTServiceDescriptor"
type="xMMTServiceDescriptor"/>
    <xs:complexType name="xMMTServiceDescriptor">
        <xs:sequence>
            <xs:element name="MMTChannel" type="xMMTChannel"/>
            <xs:anynamespace="##other" processContents="lax"
              minOccurs="0"
maxOccurs="unbounded"/>
        <xs:sequence>
        </xs:attribute name="version" type="xs:decimal" use="required"/>
        <xs:attribute name="descriptorURL" type="xs:anyURI"/>
        <xs:attribute name="descriptorProvider" type="xs:string"/>
        <xs:attributename="duration" type="xs:nonNegativeInterger"
          minOccurs="0"/>
        <xs:anyAttribute namespace="##any"/>
</xs:complexType>
<xs:complexType name="xMMTChannel">
    <xs:sequence>
        <xs:choice maxOccurs="unbounded">
            <xs:element name="name" type="xs:string"/>
            <xs:element name="link" type="xs:anyURI"/>
            <xs:element name="channelDescription" type="xs:string"/>
            <xs:element name="releaseDate" type="dateTime"
              minOccurs="0"/>
            <xs:element name="lastBuildDate" type="dateTime"
              minOccurs="0"/>
            <xs:any namespace="##other" processContents="lax"
              minOccurs="0"/>
maxOccurs="unbounded"/>
        </xs:choice>
        <xs:element name="MMTPackage" type="xMMTPAckage"
          maxOccurs="unbounded"/>
        <xs:any namespace="##other" processContents="lax"
          minOccurs="0"/>
maxOccurs="unbounded"/>
    </xs:sequence>
    <xs:attribute name="channelType" type="xs:decimal" use="required"/>
    <xs:anyAttribute namespace="##any"/>
</xs:complexType>
```

TABLE 11

```
<xs:complexType name:"xMMTPackage">
    <xs:sequence>
        <xs:choice maxOccurs="unbounded">
            <xs:element name="title" minOccurs="0"/>
            <xs:element name="packageDescription" minOccurs="0"/>
            <xs:element name="MMT_Package_id" type="xs:string"/>
            <xs:element name="startTime" type="dateTime"
              minOccurs=="0"/>
            <xs:element name="endTime" type="dateTime"
              minOccurs=="0"/>
            <xs:element name="SDPURI" type="xs:anyURI"/>
            <xs:element name="SDP" type="SDPType"/>
            <xs:element name="MMT_PaA_message_URL"
              type="xs:anyURI"/>
            <xs:SimpleType name="SDPType">
                <!---Note:the InlinedSDP below must be embedded
                  in a CDATA section->
```

TABLE 11-continued

```
                <restriction base="string"/>
            <xs:SimpleType>
                <xs:any namespace="##other" processContents="lax"
                  minOccurs="0"/>
maxOccurs="unbounded"/>
        </xs:choice>
    </xs:sequence>
    <xs:anyAttribute namespace="##any"/>
</xs:complexType>
</xs:schema>
```

The components of the MMT service descriptor schema are described in Table 12 below.

TABLE 12

| channel Type Value | Description |
| --- | --- |
| 0 | broadband channel access only. |
| 1 | broadcast channel access only |
| 2 | both of broadband and broadcast channel access. |
| 3~ | reserved for future use |

[Sementics]
MMTServiceDescriptor - The element provides information on MMT services that will be provided with MMTP from a specific service provider
version - A version of MMTServiceDescriptor
descriptorURL - The URL of corresponding to MMTServiceDescriptor
descriptorProvider - MMT service descriptor information provider.
duration - Time indicating how long a descriptor information can be kept before updating from the source
MMTChannel - A logical entity which is a group of MMT packages
name - The name of the channel.
link - The HTML page URL about the corresponding channel.
channelDescription - Description on the corresponding channel
releaseDate - The release date for the channel information
lastBuildDate - The last time the program content of the channel changed.
MMTPackage - A specific program which corresponds to a MMT package
channelType - The type of corresponding channel. It means which kind of transport channels are required to consume services described in this channel.
title - The name of the program with corresponding MMT Package
packageDescription - Description on the corresponding package
MMT_Package_id - This value is a unique identifier of the Package.
startTime - The start time of a corresponding MMT package if it is a scheduled content, e.g. linear contents. If it is a non-linear content, starTime information should be omitted.
endTime - The end time of a corresponding MMT package if it is a scheduled content, e.g. linear contents. If it is a non-linear content, endTime information should be omitted.
SDPURI - URI referring to a content referencing SDP file containing information that the MMT receiving entity needs in order to be able to receive and consume the content of the MMT Package. This content referencing SDP file is transported in a HTTP.
SDP - In-lined content referencing SDP file containing information that the MMT receiving entity needs in order to be able to receive and consume the content of the MMT Package.
MMT_PA_message_URL - URI referring to a MMT PA (Package Access) message or PA table for the corresponding MMT Package.

In the MMT service descriptor schema, "descriptorURL" is the address where the MMT service descriptor is located. The MMT receiving entity may obtain a plurality of URLs and store them therein. For example, the user may figure out the URLs of the descriptor through a certain route and store the URL information of their preferred service provider. Or, the URLs of the descriptor may be provided as information about a separate means capable of providing service list information within the service list, e.g., EPG, which is transferred via a separate broadcast physical channel. The MMT receiving entity sends a request for the descriptor at the addresses of the URLs of the descriptor to obtain the MMT service descriptor. Upon receiving descriptors as requested by the MMT receiving entity, corresponding to the request, the MMT receiving entity merges the plurality of descriptors received and provides them to the user.

Meanwhile, channelType provides type information about the channel, which provides the type information of the physical transmission channel necessary to consume the service (MMT package) described in the current channel. Upon merging the descriptors, the MMT receiving entity may consider the channel type based on whether the physical channels are available. If only broadband channels are available, then the MMT receiving entity merges only channels whose channelType is 0 and provides the merged channels.

Now described is the structure of the MMT receiving entity according to an embodiment of the disclosure.

FIG. 11 is a view illustrating a structure of an MMT receiving entity according to an embodiment of the disclosure.

FIG. 11 assumes the situation in which an MMT service descriptor-storing server (e.g., an MMT transmitting entity or a separate server) transmits a plurality of MMT service descriptors 1111, 1112, and 1113 to an MMT receiving entity 1110, and the MMT receiving entity 1110 processes the received MMT service descriptors 1111, 1112, and 1113. The components of the MMT receiving entity 1110 are described below.

The MMT receiving entity 1110 includes an MMT session initiator 1131, a descriptor URL register 1135, a descriptor extractor 1137, an MMT descriptor merger 1141, a broadcast ESG manager 1143, user preference storage 1145, a descriptor acquisition manager 1139, and an MMT service list presentation engine 1133.

The MMT session initiator 1110 extracts MMT session information of a particular program (i.e., package) chosen by the user from the service list shown to the user through the MMT service list presentation engine 1133 and processes the MMT session to be able to receive, from the MMT transmitting entity, and process the MMT package using the extracted MMT session information.

The descriptor URL register 1135 stores URL information (i.e., DescriptorURL) about where the MMT service list descriptor is located.

The MMT service list descriptor information may be provided in the following scheme.

The MMT receiving entity 1110 may obtain the descriptor information from the user's desired MMT service list descriptor information provider and previously store it in the descriptor URL register 1135.

The MMT service list descriptor may be directly stored in a separate application installed by the user and provided. The MMT service list descriptor may also be transmitted to the MMT receiving entity from a server over the Internet.

Further, the MMT service list descriptor may also be provided through additional URL (Alternative URL) information normally received from the broadcast channel through the broadcast ESG manager 1143. For reference, the broadcaster or service provider may routinely provide the additional URL information through the broadcast channel in preparation for when the broadcast service itself is unavailable, e.g., the situation in which the MMT receiving entity cannot extract the ESG due to, e.g., a failure in the reception on the broadcast channel.

The descriptor extractor 337 receives a plurality of descriptors from an MMT service descriptor storage server 1101 over the Internet using the MMT service list descriptor URL information (DescriptorURL) transferred from the descriptor URL register 1135. The descriptors may be received via various transport protocols, e.g., HTTP as an example according to the disclosure.

Which one of the plurality of descriptors is to be received may be determined by a preset user preference, and the plurality of descriptors received are delivered to the MMT descriptor merger 1141.

The MMT descriptor merger 1141 merges a plurality of MMT service list descriptors received from the plurality of MMT service descriptor servers. Meanwhile, which descriptor (e.g., KBS or MBC) is to be received, and from where (e.g., KBS or a third party provider), may be determined by the user and stored in the user preference storage 1145, and the MMT service list descriptors may be merged based on the preference information into a unitary merged MMT service list descriptor that may then be provided to the user.

The broadcast ESG manager 1143 extracts the service list information (ESG) that such a typical broadcast system, such as an advanced television systems committee (ATSC) 3.0 or digital video broadcasting (DVB), provides in a separate scheme through the lower layer, i.e., broadcast physical/transport (PHY/MAC) layer. When the terminal falls within the broadcast channel coverage for some reason, and thus there is a problem with broadcast reception, the status information (e.g., broadcast ESG cannot be provided) of the broadcast channel is provided instead of the ESG information, allowing the descriptor acquisition manager 1139 to determine which route of ESG (or service descriptor) should be shown to the user.

The user preference storage 1145 contains the user's preferred MMT service descriptor, channel, package, or such information. The above pieces of information may be used to determine which descriptor should be provided to the user.

The descriptor acquisition manager 1139 determines what route is to be used when the MMT receiving entity provides the user with the service list information. The route for providing the service list that is provided may be determined based on the information delivered from the broadcast ESG manager 1143 or the user preference storage 1145. For example, broadcast systems such as ATSC 3.0 or DVB extract service list information (ESG) from the lower broadcast physical/transport (PHY/MAC) layer. However, broadcast reception-incapable terminals, e.g., mobile terminals, cannot even start a broadcast service because they lack a method for receiving ESG. In this case, the descriptor acquisition manager 1139 provides the user with the MMT service list information delivered from the MMT descriptor merger 1141, allowing a broadcast service to commence for the user.

The MMT service list presentation engine 1133 renders the service list information obtained through the descriptor for the user, allowing the user to choose and determine his desired particular program (i.e., MMT package).

For reference, the session information of the particular program (i.e., MMT package) chosen by the user may be in the form of one of a MMT package access (PA) table, an MMT PA message, an inlined session description protocol (SDP), and a separate SDP file, and the session information is transferred to the MMT session initiator 1131. The session information is information necessary to start a session to be able to receive desired content via the MMT.

For reference, the MMT PA table is a table containing all pertinent signaling information necessary to consume the MMT package and includes pieces of information that should first be processed in order to obtain the package and show the obtained package to the user. The syntax and semantics information of the MMT PA are as defined in the MMT specifications below. Meanwhile, the MMT PA table may also be transferred in the form of a separate signaling message (PA signaling message).

Table 13 below represents the syntax of the PA table.

TABLE 13

| Syntax | Value | No. of bits | Mnemonic |
|---|---|---|---|
| PA_table 0 { | | | |
|   table_id | | 8 | uimsbf |
|   version | | 8 | ulmsbf |
|   length | | 16 | ulmsbf |
|   information_table_info { | | | |
|     number_of_tables | N1 | 8 | ulmsbf |
|     for (1=0; i<N; i++) { | | | |
|       signalling_information_table_id | | 8 | uimsbf |
|       signalling_information_table_version | | 8 | uimsbf |
|       location { | | | |
|         MMT_generaljocation_info() | | | |
|       } | | | |
|       reserved | '1111 111' | 7 | bslbf |
|       alternative_location_flag | | 1 | bsibf |
|       if (alternative_location_flag == 1) { | | | |
|         alternative_location { | | | |
|           MMT_general_location_info() | | | |
|         } | | | |
|       } | | | |
|     } | | | |
|   } | | | |
|   reserved | '1111 111' | 7 | bslbf |
|   private_extension_flag | | 1 | bslbf |
|   if (private_extension_flag == 1) | | | |
|     private_extension { | | | |
|     } | | | |
|   } | | | |
| } | | | |

The semantics of the elements in Table 13 above is the same as that shown in Table 14 below.

TABLE 14

[Semantics]

table_id-indicates the identifier of the PA table.
version-indicated the version of the PA table. The newer version obsoletes the information in any older version.
length-indicates the length of the PA table in bytes, counting from the beginning of the next field to the last byte of teh PA table. The value '0' is not valid for this field.
number_of_table-indicates the number of signalling tables whose information are provided in this PA table.
signalling_information_table_id-indicates the ID of a signalling table whose information are provided in this PA table.
MMT_general_location_info-provides the location of a signalling table whose information are provided in this PA table. Syntax and semantics of MMT_general_location_info are defined in 9.6.1.
alternative_location_flag-if this flag is set to '1', an alternative address from where an MMT receiving entity can get the information table is provided.
MMT_general_location_info_alternative_location-provides the information of an alternative address from where an MMT receiving can get the signalling table. Only location_type from '0x07' to '0x08' shall be used in MMT_general_location_info for second location.

TABLE 14-continued

[Semantics]

private_extension_flag-if this is '1', the private extension is present.
private_extension-a syntax element group serving as a container for propietary or application-specific extensions.

Now described are operations of the MMT receiving entity according to an embodiment of the disclosure.

FIG. 12 is a view illustrating operations of an MMT receiving entity according to an embodiment of the disclosure.

In step 1201, the MMT receiving entity obtains URLs of one or more MMT service descriptors and stores them therein. In step 1203, the MMT receiving entity obtains and stores user preference descriptor information. In step 1205, the MMT receiving entity receives MMT service descriptors using the obtained descriptor URLs. In step 1207, the MMT receiving entity determines whether an ESG is receivable through a broadcast channel, and if receivable, goes to step 1209 to receive an ESG through the broadcast channel, and then goes to step 1211. Unless an ESG is receivable through the broadcast channel, the MMT receiving entity immediately goes to step 1211.

In step 1211, the MMT receiving entity determines the type of the receiving channels and, in step 1213, classifies them into particular channel types depending on whether the terminal's physical channels are available. In step 1215, the MMT receiving entity aggregates the descriptors for each of the same type of channels into an aggregate descriptor and, in step 1217, displays the aggregate descriptor to the user. In step 1219, when the user chooses a particular program (package) in the descriptor, the MMT receiving entity initiates an MMT session to receive the chosen package in step 1221 and controls the initiated session, and the MMT receiving entity receives, through the MMTP, the package chosen through the session in step 1223.

Now described are operations of an MMT transmitting entity according to an embodiment of the disclosure.

FIG. 13 is a view illustrating operations of an MMT transmitting entity according to an embodiment of the disclosure.

In step 1301, the MMT transmitting entity lists the MMT packages constituting a particular channel.

In step 1303, the MMT transmitting entity determines whether the channel is intended for linear broadcasting. If the channel is intended for linear broadcasting, the MMT transmitting entity goes to step 1305, putting time property information (StartTime and EndTime) of the particular time when the package is broadcast in the package constituting the channel, then to step 1307. If the channel is intended for non-linear broadcasting, the MMT transmitting entity immediately goes to step 1307. In step 1307, the MMT transmitting entity stores the MMT service descriptor and, in step 1309, transmits the MMT service descriptor. Then, the MMT transmitting entity proceeds to step 1311, updating the MMT service descriptor as necessary. Embodiments of the disclosure have been described above. In conventional broadcast systems (e.g., ATSC 1.0), broadcast reception-incapable terminals cannot receive any ESG, and are thus unable to even start a broadcast service.

However, broadcast-telecommunications-integrated hybrid broadcast systems (e.g., ATSC3.0 or DVB), which have been recently rising, should serve mobile terminals or other various devices unlike conventional TV-centered broadcast systems. In such a hybrid broadcast service for serving mobile terminals, terminals may be located out of broadcast coverage, in which case the terminals may not be able to extract the ESG. This may lead to the situation in which the broadcast service is impossible to receive despite broadband channels being available. Embodiments of the disclosure may provide users with a user-centered integrated ESG in broadcast-telecommunications integrated hybrid broadcast systems.

Third Disclosure

According to an embodiment of the disclosure, there is proposed a device and method for transmitting/receiving content-related information in a multimedia system.

According to an embodiment of the disclosure, there is proposed a device and method for managing media resources based on service circumstances in a multimedia system.

According to an embodiment of the disclosure, there is proposed a device and method for efficiently managing media resources by providing media content signaling information and media content resource information depending on service circumstances (e.g., the number of users) when providing a media content service, actually and in realtime, by providing dynamic media resource distinction information appropriate for, e.g., the number of service users, user environment, or location, in an existing static media resource allocation environment using a MPEG media transport (MMT)-based media content streaming service. As proposed to conventional over-the-top (OTT) service providers or communication carriers to reduce network traffic, content delivery network (CDN) servers or content servers may be installed in their networks. Conventional mobile broadcasting, which has a central server accessed by users, places separate edge servers for receiving necessary data near the origin server in order to prevent data transmission from slowing down due to increasing use of mobile data and the resulting simultaneous access to the server by many people. At this time, managing mobile data traffic load, e.g., per-edge server overload or access delay, is significant.

The disclosure relates to transmitting composite multimedia data over a hybrid network including a broadcast network, telecommunication network, and other networks and proposes a device and method for transmitting composite multimedia data by adopting an MPEG media transport (MMT) scheme.

Meanwhile, devices and methods proposed according to an embodiment of the disclosure are applicable to digital multimedia broadcasting (DMB) services, digital video broadcasting-handheld (DVP-H), advanced television systems committee-mobile/handheld (ATSC-M/H) service or other mobile broadcast services, internet protocol television (IPTV) services or other digital video broadcast systems, moving picture experts group (MPEG) media transport (MMT) systems, evolved packet system (EPS), long-term evolution (LTE) mobile communication systems, LTE-advanced (LTE-A) mobile communication systems, high speed downlink packet access (HSDPA) mobile communication systems, high speed uplink packet access (HSUPA) mobile communication systems, $3^{rd}$ generation partnership project 2 (3GPP2) high rate packet data (HRPD) mobile communication systems, 3GPP2 wideband code division multiple access (WCDMA) mobile communication systems, 3GPP2 code division multiple access (CDMA) mobile communication systems, institute of electrical and electronics engineers (IEEE) 802.16m communication systems or other communication systems, mobile internet protocol (Mobile IP) systems or other various communication systems.

First, in an MMT-based media content streaming service, MMC media content-related content signaling information, which the content provider provides, e.g., MMC media content-related media content signaling information, such as MMT_general_location_info, or media resource allocation information, which the service provider provides, e.g., valid time, transmission access type, or other media resource allocation information, are merged to provide a media content streaming service based on dynamic media resource distinction information upon using the media content service.

To use service in the conventional CDN environment, the user device first accesses the server of the provider that provides a user's desired media service to fetch the address of the CDN server providing the media service. The user device accesses the managing server (e.g., CDN Fram) managing CDN information based on the received CDN server address, receiving the media service server address fitting the reception environment of the service user (e.g., the service user's location). The service user may be able to use the media service based on the media service server address received from the CDN managing server. As such, CDN is technology enabling quick and stable transmission of massive content online, which may distribute content to the CDN servers of major ISPs and allows the user to receive content from the closest server on the network routes, thereby preventing traffic from concentrating on a particular server and distributing traffic to local servers.

According to an embodiment of the disclosure, in the CDN environment, MMT media content-related media content signaling information and media resource allocation information are given to the user, e.g., the user device, the network status and circumstance are grasped, and various pieces of information for access are provided to the user, thus contributing to efficiently providing media service.

At this time, according to an embodiment of the disclosure, the process of communicating with the service provider's server to receive CDN server information and communicating with the CDN managing server to obtain the media server's address is instead performed by a DRI server in order to figure out the server address of the user's desired media service. Here, 'DRI server' means a server that receives, in realtime, the media service from the service provider, sends a request for corresponding information to the CDN managing server, stores the actual server address of each media service in the form of a reception message, and provides the media content resource allocation information to the user through a DRI message. Further, the DRI server figures out the address of the server providing media content signaling information of the media and provides the media content signaling information to the user via a DSI message.

Tables 15 and 16 represent basic configurations of the DRI message and DSI message.

For example, upon accessing the service, the service user receives the DRI message and DSI message that the content and service provider provides and then identifies the message version, thus determining whether to update with respect to the existing message. At this time, 'DRI message' means media resource allocation information that the DRI server receives while communicating with the CDN server and service user server, and 'DSI message' means the signaling information of the media content. Thereafter, the service user receives media content signaling information using the MMC media content-related media content signaling information, i.e., DSI message, which has been received through the content and service provider. Further, the user receives, through the DRI message, the media resource allocation information which the content and service provider provides and sends a request for media content to, and receives the media content from, the media content server.

At this time, upon providing media content resource allocation information and media content signaling information, the content and service provider puts priority on media content signaling servers and media content resource servers, which the user may access based on or considering, e.g., the user's information or network context, and transfers the information to the user through the DRI message and DSI message.

FIG. 16 shows an example of operations of the receiver after the user receives the DRI message. The user may receive media content from a primary_media_location through the message. When the media content server lacks the requested media content when the request for the information is sent to the primary_media_location or the server does not operate, a request for the media content may be sent to an Alternative_media_location and the media content may be received therefrom. If neither the primary_media_location server nor the Alternative_media_location server operates or the media content is not there, it sends a request for the desired media content to the server based on server information provided from an origin_media_location and receives the media content. Here, the priority of the media content resource allocation information provided through the DRI message is provided by the DRI server through, e.g., the service user's location and network status information. Here, the priority of media content resource allocation information means resource allocation information to designate the server, which may provide the most optimal service to the service user, as the primary_location server and designates the next best server providing the media service as the Alternative_location or origin_location server based on the information of the content and service provider's server, allowing the service user to take advantage of the same.

Also upon receiving the media content signaling information, the service user receives media content signaling information based on the DSI message received through the DRI server. FIG. 17 illustrates an example of the operation of the receiver to receive media signaling information after the user receives the DSI message.

The user sends a request for the media content signaling information to the media server based on the DSI message received from the DRI server. At this time, the request of the information is made based on the pre-designated priorities in the DSI message. It accesses the media server address of the content and service provider first provided to the primry_signaling_location and requests media content signaling. If the primary_signaling_location fails to receive the information or is providing media content signaling information older in version than the existing media content signaling information, a request is sent through the alternative_signaling_location, and upon failing to receive the signaling information even through the alternative_signaling_location, it may receive the medai content signaling information through the server address being provided from the origin_signaling_location. At this time, the primary_signaling_location, the alternative_signaling_location, and the origin_signaling_location provide the media content signaling information, subjected to the access priorities, using, e.g., the service user's location and content information based on the information that the DRI server has received through the content and service provider's server.

TABLE 15

| Syntax | Value | No. of bits | Mnemonic |
|---|---|---|---|
| DRI_message () { | | | |
|   message_id | | 8 | uimsbf |
|   version | | 8 | uimsbf |
|   length | | 16 | uimsbf |
|   message_payload { | | | |
|     valid_time_start | | 32 | uimsbf |
|     valid_time_duration | | 32 | uimsbf |
|     number_of_assets | | 8 | uimsbf |
|     for (1=20; i<N1; i++) | N1 | | |
|       location_count | | 8 | uimsbf |
|       asset_id () | | | |
|         for (1=0; i<N2; i++) { | N2 | | |
|           primary_media_location { | | | |
|             update_asset_primary_location { | | | |
|             MMT_general_location_Info () | | 32 | ulmsbf |
|             Transmission_access_type 0 | | | |
|           MMT_general_location_info() | | | |
|           } | | | |
|         } | | | |
|         alternative_media_location { | | | |
|           number_of_alternative | N3 | 8 | ulmsbf |
|           for (i=0; i<N3; i++) { | | | |
|             update_asset_Alternative_location { | | | |
|             MMT_general_location_info() | | | |
|             Transmission_access_type () | | 32 | ulmsbf |
|           } | | | |
|         } | | | |
|       } | | | |
|     } | | | |
| } | | | |
|   original_media_location { | | | |
|     update_asset_origin_location { | | | |
|     MMT_general_location_info() | | | |
|     Transmission_access_type () | | 32 | ulmsbf |
|     } | | | |
|   } | | | |
|   } | | | |
|   reserved | | 8 | ulmsbf |
| } | | | |

Table 15 above represents the DRI message according to an embodiment of the disclosure.

As set forth in Table 15 above, the parameters contained in the DRI message as proposed according to an embodiment of the disclosure mean as follows.

[Semantics]

message_id—indicates DRI message ID. The length of this field is 16 bits.

version—indicates the version of MRI messages. MMT receiving entity may check whether the received message is new or not. The length of this field is 8 bits.

length—indicates the length of MRI messages. The length of this field is 16 bits. It indicates the length of the MRI message counted in bytes starting from the next field to the last byte of the MRI message. The value '0' shall not be used.

valid_time_start—indicates a UTC time in NTP format corresponding to transmission session valid start time. This field is the 32 bits MSB from the full resolution NTP timestamp valid_time_duration—indicates a UTC time in NTP format corresponding to transmission session valid stop time. This field is the 32 bits MSB from the full resolution NTP timestamp number of assets—provides the number of Assets whose information is provided by MP table.

location_count—provides the number of location information for an Asset.

Set to '1' when an Asset is delivered through one location. When bulk delivery is achieved, in which MPUs contained in an Asset are delivered through multi-channels, not '1' is set. When one Asset is delivered over multiple asset_id—indicates the asset_id as defined in 9.6.2. of another Asset on which the dependent Asset associated with this descriptor depends. The order of the id-s provided in this descriptor is such that the concatenation of MPUs as defined in section 5.2.3 leads to a valid MPU and follows the media dependency hierarchy.

update_asset_primary_location—provides the location of the primary address from which an MMT receiving entity can get the Asset.

number of alternative—provides the number of alternative address update_asset_Alternative_location—provides the location of an alternative address from which an MMT receiving entity can get the Asset.

update_asset_origin_location—provides the location of the origin address from which an MMT receiving entity can get the Asset.

MMT_general_location_info_—provides the location information of Asset. General location reference information for Asset defined in 9.6.1 is used. Only the value of location_type between '0x00' and '0x06' shall be used for an Asset location.

Transmission_access_type—indicates type of transmission access channel of media content delivery as shown in Table AMD1. 17.

TABLE 16

| Syntax | Value | No. of bits | Mnemonic |
|---|---|---|---|
| DSI_message () { | | | |
|   message_id | | 16 | ulmsbf |
|   version | | 8 | ulmsbf |
|   length | | 16 | ulmsbf |
|   message_payload { | | | |
|     valid_time_start | | 32 | ulmsbf |
|     valid_time_duration | | 32 | uimsbf |
|     number_of_mmt_signaling | | 8 | uimsbf |
|     for (i=0; i<N1; i++) { | N1 | | |
|       message_id | | | |
|       primary_signaling_location ( | | | |
|         MMT_generallocation_Info () | | 32 | uimsbf |
|         Transmission_access_type () | | | |
|       } | | | |
|       alternative_signaling_location ( | | | |
|         number_of alternative | | 8 | uimsbf |
|         for (i=0; i<N2; i++) { | N2 | | |
|           MMT_generallocation_Infoo | | 32 | uimsbf |
|           Transmission_access_type () | | | |
|         } | | | |
|       } | | | |
|     } | | | |
|     original_signaling_location { | | | |
|       MMT_general_location_Infoo | | 32 | ulmsbf |
|       Transmission_access_type () | | | |
|     } | | | |
|     Reserved | | 8 | Ulmsbf |
|   } | | | |
| } | | | |

Table 16 above represents the DSI message according to an embodiment of the disclosure.

As set forth in Table 16 above, the parameters contained in the DSI message as proposed according to an embodiment of the disclosure mean as follows.

[Semantics]

message_id—indicates DSI message ID. The length of this field is 16 bits.

version—indicates the version of DSI messages. MMT receiving entity may check whether the received message is new or not. The length of this field is 8 bits.

length—indicates the length of DSI messages. The length of this field is 16 bits. It indicates the length of the MRI message counted in bytes starting from the next field to the last byte of the DSI message. The value '0' shall not be used.

valid_time_start—indicates a UTC time in NTP format corresponding to transmission session valid start time. This field is the 32 bits MSB from the full resolution NTP timestamp valid_time_duration—indicates a UTC time in NTP format corresponding to transmission session valid stop time. This field is the 32 bits MSB from the full resolution NTP timestamp number of mmt signaling—provides the number of signaling message message_id—indicates the message ID. The length of this field is 16 bits primary_signaling_location—provides the location of the primary address from which an MMT receiving entity can get the signaling information.

Alternative_signaling_location—provides the location of an alternative address from which an MMT receiving entity can get the signaling information.

number of alternative—provides the number of alternative address

Origin_signaling_location—provides the location of an alternative address from which an MMT receiving entity can get the signaling information.

MMT_general_location_info_—provides the location information of Asset. General location reference information for Asset defined in 9.6.1 is used. Only the value of location_type between '0x00' and '0x06' shall be used for an Asset location.

Specific processes curtain control device are described below.

First, a specific process in which the media content server lacks desired information is described below.

When the service user accesses the service and uses the media service, the service user sends a request for media content resource allocation information and media content signaling information to the DRI server. The DRI server receives, in realtime, the media service information from the service provider, sends a request for the information to the CDN managing server, receives each actual piece of media service resource allocation information and the media content signaling providing server address, stores them in the form of messages, and provides the user with the media content resource allocation information through the DRI message and DSI message. By way of the DRI message and DSI media content signaling information, the service user receives the media content resource and media content signaling and uses the service.

As illustrated in FIG. 18, the service user sends a request for service to the media server using the media content resource allocation information. At this time, each piece of media content resource allocation information and media content signaling information are determined for priority of access depending on the service provider's server and network context. The DRI server transmits, to the user through the DRI message, the media content resource allocation information to receive the media content resource. The media content resource allocation information in the DRI message has the following priority. The server closest to the user within the CDN network may be assigned as the primary_media_location media server, and the next best server may be designated as the alternative_media_location, the content provider's server, i.e., the origin_media_location capable of providing the media content in any circumstances. The service user first sends a request for the media content resource to the primary_media_location for requesting the media resource in the DRI message.

Upon failing to receive the media content from the primary_media_location, the user accesses the content provided from the alternative_media_location or the media content server of the media service provider to request the media service. Upon failing to receive the information from the primary_media_location and the alternative_media_location media servers, the user receives the media content from the corresponding server using the address of the origin_media_location. When the alternative_media_location provides the media content of a different form (resolution or codec) from that of the content, although it is the prior media service that the media service user is receiving from the primary_media_location, the user may send a request for the media content to the origin_media_location and use the service.

To use the media service, the service user needs to receive not only the media content resource but also media content signaling information. The media content signaling information may be transferred to the service user through the DSI message. The media content signaling information is requested based on the priority that the content or service user has preset depending on the service provider's server and network context and the user's context for the information in the DSI.

To use the media service, the service user sends a request for media content signaling information to the content and service provider's server based on the primary_signaling_location information in the DSI message and receives the signaling information of the media content. Upon failing to receive the signaling information from the primary_signaling_location or if the received information is not the latest information or is a different version from the previously received media content signaling information, the service user again sends a request for media content signaling information to the alternative_signaling_location and receives the same from the alternative_signaling_location. Upon failing to receive the media content signaling information despite the above two requests, the user sends a request for the media content signaling information to the origin_signaling_location and receives the same from the origin_signaling_location. Here, the origin_signaling_location means the server of the service provider or content provider. This server is a media server that should provide the media content resource and media content signaling information if it is providing a media content server.

Second, an operation process is described below in the case in which a media content service is provided over different heterogeneous networks.

Upon using a media content service from the content and service provider, media content may be received through the different heterogeneous networks depending on the network context and the service user's environment. In this case, the media service may be provided through the different heterogeneous networks using the media content signaling information and media content resource allocation information in the DSI and DRI messages provided from the DRI server.

For example, when the primary receiving server information in the DSI and DRI messages is set to the service provider's server, and the alternative server's information is set to the content provider's server, the content provider server may be located inside or out the service provider's network.

When the first media service user accesses the service in area 3 of FIG. 15, the user receives the DRI and DSI messages for his desired media content server information and uses the media service based on the media content resource allocation information and media content signaling information. In this case, the user accesses the server of the service provider assigned to the primary_media_location and primary_signaling_location to receive media content, using the service. However, when the service provider's server cannot provide service while the service is in use, the user may request that the server allow the user to seamlessly use the media content service using the server of the content provider assigned to the alternative_media_location and alternative_signaling_location and the transmission channel defined in the transmission_access_type.

Further, the media content signaling information, which is transmitted only through Wifi or broadcast network, i.e., heterogeneous networks, may be provided through the alternative_signaling_location or origin_signaling_location, thereby offering additional information to enable access to a third service provider's media content signaling server and hence allowing for the reception of the service which used to be provided over the heterogeneous network.

For example, the service user in area 3 of FIG. 15, who is using a communication carrier's service in the LTE environment, may send a request for information to, and receive the information from, the alternative_signaling_location or origin_signaling_location, which possesses broadcast channel signaling information, to use a broadcast channel being provided on other channel, receiving broadcast channel information which is being provided in the broadcast environment and using the broadcast service using the resource allocation information.

A specific operation process wherein media content service information is modified in the middle of service is described below.

First, when the service user accesses the service and uses the media service, the service user sends a request for media content resource allocation information and media content signaling information to the DRI server. The service user receives the media content resource and media content server using the DRI message and the DSI message. When the service provider modifies the media content resource allocation server and media content signaling information depending on the network context and service user's environment while corresponding information is requested based on the media content resource allocation information and media content signaling access priority and the service is in use, existing service users may not continue to use the service due to a discrepancy between the media content signaling information and the media content resource information received from the new server.

For example, the content and service provider may determine temporarily modifying the service user's service, e.g., modifying the resolution, when too many users come into the service or due to a temporary network performance shutdown around the user. When something in the communication environment goes wrong, e.g., due to poor Wifi or temporary traffic congestion, the content and service provider may temporarily downgrade the LTE service quality from FHD to HD in order to carry on the seamless service.

In such a case, the media content resource may be received from the alternative_media_location which the content and service provider provides. The user sends a request for media content signaling information fitting the media content and updated by the alternative_signaling_location or origin_signaling_location according to the given access priority in the DSI message and is seamlessly served based on the information.

Further, as an example, in the CDN environment, the media servers located near a crowded area are designated as the primary_media_location and primary_signaling_location according to the number of media service users, thereby providing seamless service to the users in the hot spot area. When the nearby media servers cannot continue to provide the media service due to a diminishing number of service users or in the service provider's context, media server information of the nearby media servers is provided through the alternative_media_location, alternative_signaling_location or origin_media_location or origin_signaling_location, thereby providing the media content resource and media content signaling information of the media service.

According to an embodiment of the disclosure, the content and service provider may dynamically allocate media resources depending on the network context and service user's environment, thus allowing for efficient network management and seamless streaming upon providing media content in realtime or non-realtime.

According to an embodiment of the disclosure, the service provider allows for efficient realtime streaming and use of a media content service between heterogeneous networks by assigning priorities to servers for receiving media content signaling information.

Meanwhile, although not shown separately, the transmitting device, receiving device, origin server, alternative server, primary server, DRI/DSI server, client, or other entities in the multimedia system according to an embodiment of the disclosure may each include a transmitter, a controller, a receiver, and a storage unit.

The controller controls the overall operation of any one of the entities, e.g., the transmitting device, receiving device, origin server, alternative server, primary server, DRI/DSI server, and client. In particular, the controller controls the entity to perform operations related to transmitting/receiving content-related information in the multimedia system according to an embodiment of the disclosure. Here, the operations related to transmitting/receiving content-related information in the multimedia system, as performed by the entity, according to an embodiment of the disclosure, are the same as those described above in connection with FIGS. 15 to 18, and no detailed description thereof is given herein.

The transmitter transmits various signals and messages to at least one other entity under the control of the controller. Here, various signals and messages transmitted by the transmitter are the same as those described above in connection with FIGS. 15 to 18, and no detailed description thereof is repeated.

The receiver receives various signals and messages from at least one other entity under the control of the controller. Here, various signals and messages received by the receiver are the same as those described above in connection with FIGS. 15 to 18, and no detailed description thereof is repeated.

Further, the storage unit stores various data and various programs to perform operations related to transmitting/receiving content-related information in the multimedia system, according to an embodiment of the disclosure, as performed by the entity, as described above in connection with FIGS. 15 to 18 and stores data that is created upon performing operations related to transmitting/receiving content-related information in the multimedia system, according to an embodiment of the disclosure, as performed by the entity, as described above in connection with FIGS. 15 to 18.

Meanwhile, although the entity has been described above to be implemented with separate units, e.g., the transmitter, controller, receiver, and storage unit, the entity may also be implemented with a combination of at least two of the transmitter, controller, receiver, and storage unit.

Although the entity has been described above to be implemented with separate units, e.g., the transmitter, controller, receiver, and storage unit, the entity may also be implemented as a single processor.

According to an embodiment of the disclosure, content-related information can be transmitted/received in a multimedia system. According to an embodiment of the disclosure, a multimedia system can manage media resources based on service contexts.

According to an embodiment of the disclosure, it is possible to efficiently manage media resources by providing media content signaling information and media content resource information depending on service circumstances (e.g., the number of users) when providing a media content service, actually and in realtime, by providing dynamic media resource distinction information appropriate for, e.g., the number of service users, user environment, or location, in the existing static media resource allocation environment by using a MPEG media transport (MMT)-based media content streaming service.

The invention claimed is:

1. A method for providing a media content, the method comprising:
    receiving, by a moving pictures experts group (MPEG) media transport (MMT) aware network entity (MANE), an MMT media content and a signaling message related to the MMT media content from an MMT transmitting entity, the signaling message including a package access (PA) message containing an MMT package (MP) table;
    receiving, by the MANE, a modification request message to request to modify particular media data of at least part of the MMT media content;
    updating, by the MANE, the MP table in the PA message in the signaling message related to the particular media data requested to be modified based on the modification request message; and
    transmitting, by the MANE, the updated signaling message to an MMT receiving entity.

2. The method of claim 1, wherein the signaling message comprises information to indicate that the particular media data is modified.

3. The method of claim 1, wherein the modification request message comprises at least one of information related to the particular media data to be modified, information related to a time for the modification, or location information about media data to be applied to the particular media data to be modified.

4. The method of claim 3, wherein the information related to the particular media data to be modified comprises at least one of an identifier of the particular media data or an identifier of a data unit to be modified in the particular media data.

5. The method of claim 4, wherein the information related to the time for the modification comprises at least one of information about a scheme of indicating a time of occurrence of the modification or information about duration of the modification.

6. The method of claim 5, wherein the information about the scheme of indicating the time of occurrence of the modification is based on a time or a sequence number of a data unit included in the particular media data.

7. The method of claim 1, wherein the modification request message comprises modification type information indicating whether a type of the modification is replacing or overlaying.

8. The method of claim 1, further comprising:
updating the media content based on the modification request message; and
transmitting the updated media content to the MMT receiving entity.

9. A network entity configured to provide a media content, the network entity comprising:
a transceiver coupled with at least one processor; and
the at least one processor is configured to:
receive a moving pictures experts group (MPEG) media transport (MMT) media content and a signaling message related to the MMT media content from an MMT transmitting entity, the signaling message including a package access (PA) message containing an MMT package (MP) table,
receive a modification request message to request to modify particular media data of at least part of the media content,
update the MP table in the PA message in the signaling message related to the particular media data requested to be modified based on the modification request message, and
transmit the updated signaling message to an MMT receiving entity,
wherein the network entity comprises a MMT-aware network entity MANE).

10. The network entity of claim 9, wherein the signaling message comprises information to indicate that the particular media data is modified.

11. The network entity of claim 9, wherein the modification request message comprises at least one of information related to the particular media data to be modified, information related to a time for the modification, or location information about media data to be applied to the particular media data to be modified.

12. The network entity of claim 11, wherein the information related to the particular media data to be modified comprises at least one of an identifier of the particular media data or an identifier of a data unit to be modified in the particular media data.

13. The network entity of claim 12, wherein the information related to the time for the modification comprises at least one of information about a scheme of indicating a time of occurrence of the modification or information about duration of the modification.

14. The network entity of claim 13, wherein the information about the scheme of indicating the time of occurrence of the modification is based on a time or a sequence number of a data unit included in the particular media data.

15. The network entity of claim 9, wherein the modification request message comprises modification type information indicating whether a type of the modification is replacing or overlaying.

16. The network entity of claim 9, wherein the at least one processor is further configured to:
update the media content based on the modification request message; and
transmit the updated media content to the MMT receiving entity.

17. The network entity of claim 9, wherein the modification request message is received from a first transmitting entity configured to transmit the media content or a third transmitting entity different from the first transmitting entity.

* * * * *